US009639711B2

(12) United States Patent
Sturonas et al.

(10) Patent No.: US 9,639,711 B2
(45) Date of Patent: *May 2, 2017

(54) SYSTEMS AND METHODS FOR DATA VERIFICATION AND REPLAY PREVENTION

(71) Applicant: PKWARE, Inc., Milwaukee, WI (US)

(72) Inventors: Joe Sturonas, Lake Bluff, IL (US); Theodore Czotter, Holliston, MA (US); Chris Nevin, Plymouth, MA (US); James Robson, Melba, ID (US)

(73) Assignee: PKWARE, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,296

(22) Filed: Jul. 15, 2015

(65) Prior Publication Data
US 2015/0347782 A1 Dec. 3, 2015

Related U.S. Application Data

(63) Continuation of application No. 14/015,325, filed on Aug. 30, 2013, now Pat. No. 9,129,130.

(60) Provisional application No. 61/695,972, filed on Aug. 31, 2012.

(51) Int. Cl.
H04L 29/06 (2006.01)
G06F 21/62 (2013.01)
H04L 9/08 (2006.01)
G06F 21/64 (2013.01)

(52) U.S. Cl.
CPC .......... G06F 21/6218 (2013.01); G06F 21/64 (2013.01); H04L 9/0822 (2013.01); H04L 63/1466 (2013.01); G06F 2221/2151 (2013.01); H04L 63/0428 (2013.01); H04L 63/123 (2013.01)

(58) Field of Classification Search
CPC ............... G06F 21/6218; H04L 9/0822; H04L 63/1466; H04L 63/0428; H04L 63/123
USPC .......................................................... 713/165
See application file for complete search history.

(56) References Cited

U.S. PATENT DOCUMENTS

| 2002/0120639 A1* | 8/2002 | Basin ................ G06F 17/30153 |
| 2003/0145248 A1 | 7/2003 | McNeil |
| 2005/0015608 A1 | 1/2005 | Peterson |
| 2008/0086642 A1* | 4/2008 | Takahashi ............. H04L 9/3247 713/176 |
| 2009/0222662 A1* | 9/2009 | Hataoka ............... G06Q 20/341 713/169 |
| 2009/0300169 A1 | 12/2009 | Sagar et al. |
| 2010/0332818 A1 | 12/2010 | Prahlad et al. |

(Continued)

FOREIGN PATENT DOCUMENTS

WO 2012049592 4/2012

OTHER PUBLICATIONS

Sushmita Ruj; Privacy Preserving Access Control with Authentication for Securing Data in Clouds; 2012 12th IEEE/ACM; p. 556-563.*

(Continued)

Primary Examiner — Monjour Rahim
(74) Attorney, Agent, or Firm — Barich IP Law Group

(57) ABSTRACT

A system and method are provided for the secure sharing of information stored using cloud storage services and for performing data verification and replay protection for information stored on an open network.

22 Claims, 12 Drawing Sheets

(56) References Cited

U.S. PATENT DOCUMENTS

| | | | |
|---|---|---|---|
| 2011/0040980 A1* | 2/2011 | Kerr | G06F 21/6245 713/189 |
| 2011/0252071 A1 | 10/2011 | Cidon | |
| 2012/0166576 A1 | 6/2012 | Orsini et al. | |
| 2012/0198237 A1 | 8/2012 | Balinsky et al. | |
| 2012/0317414 A1* | 12/2012 | Glover | G06Q 10/101 713/165 |

OTHER PUBLICATIONS

PCT International Search Report in International Application No. PCT/US13/57531 dated Apr. 15, 2014.

PCT Written Opinion of the International Searching Authority in International Application No. PCT/US13/57531 dated Apr. 15, 2014.

Cunningham, "SpiderOak: Dropbox for the security obsessive." (online) retrieved on Feb. 18, 2014, published Apr. 1, 2012. Retrieved from the Internet <URL:http://arstechnica.com/business/2012/04/spideroak-dropbox-for-the-security-obsessive/2/>p. 2.

Gastil et al. "Deniable Cloud Storage: Sharing Files via Public-key Deniability." WPES 10, Oct. 4, 2010, Chicago, Illinois, USA. Copyright 2010 ACM. Retrieved from the Internet <URL:http://dLacm.org/citation.clm?Id=1866925> entire document.

Yih-Chun Hu; SEAD: secure efficient distance vector routing for mobile wireless ad hoc networks: Year: 2003; p. 175-192.

Partial Supplementary European search report issued by the European Patent Office on Jul. 20, 2016.

Extended European search report, dated on Oct. 27, 2016 (Oct. 27, 2016), including the supplementary European search report (Art. 153(7) EPC) and the European search opinion.

Alok Kumbhare et al: "Cryptonite: A Secure and Performant Data Repository on Public Clouds", Cloud Computing (Cloud), 2012 IEEE 5TH International Conference on, IEEE, Jun. 24, 2012 (Jun. 24, 2012), pp. 510-517, XP032215334.

Kuan-Ying Huang et al: "SSTreasury+: A secure and Elastic Cloud Data Encryption System", Genetic and Evolutionary Computing (ICGEC), 2012 Sixth International Conference on, IEEE, Aug. 25, 2012 (Aug. 25, 2012), pp. 518-521, XP032327226, DOI: 10.1109/ICGEC.2012.132, ISBN: 978-1-4673-2138-9.

* cited by examiner

| | Name | Date modified | Type | Size |
|---|---|---|---|---|
| | CxrIM-iimykOu2yYd15YKwTW9sM.sid | 7/17/2012 4:02 PM | SID File | 4 KB |
| | CxrIM-iimykOu2yYd15YKwTW9sM-150398065.pid | 7/17/2012 4:03 PM | PID File | 1 KB |
| | CxrIM-iimykOu2yYd15YKwTW9sM-150463669.pid | 7/17/2012 4:03 PM | PID File | 1 KB |
| | CxrIM-iimykOu2yYd15YKwTW9sM-150463669-1342558250.sk | 7/17/2012 4:04 PM | SK File | 5 KB |
| | CxrIM-iimykOu2yYd15YKwTW9sM-150463669-1344978180.sk | 8/14/2012 4:04 PM | SK File | 5 KB |
| | CxrIM-iimykOu2yYd15YKwTW9sM-150466644.pid | 7/17/2012 4:03 PM | PID File | 1 KB |
| | CxrIM-iimykOu2yYd15YKwTW9sM-150466644-1342558752.sk | 7/18/2012 11:41 AM | SK File | 5 KB |
| | CxrIM-iimykOu2yYd15YKwTW9sM-150466644-1342629638.sk | 7/20/2012 4:09 PM | SK File | 5 KB |
| | CxrIM-iimykOu2yYd15YKwTW9sM-150466644-1342818544.sk | 7/17/2012 4:17 PM | SK File | 5 KB |
| | CxrIM-iimykOu2yYd15YKwTW9sM-150471601.pid | 7/23/2012 10:56 AM | PID File | 1 KB |
| | CxrIM-iimykOu2yYd15YKwTW9sM-150471601-1342559683.sk | 7/17/2012 5:15 PM | SK File | 5 KB |
| | CxrIM-iimykOu2yYd15YKwTW9sM-150478271.pid | 7/20/2012 8:40 AM | PID File | 1 KB |
| | CxrIM-iimykOu2yYd15YKwTW9sM-150478271-1342561117.sk | 7/17/2012 6:04 PM | SK File | 5 KB |
| | CxrIM-iimykOu2yYd15YKwTW9sM-150499113.pid | 7/17/2012 6:07 PM | PID File | 1 KB |
| | CxrIM-iimykOu2yYd15YKwTW9sM-150499113-1342566198.sk | 7/18/2012 9:38 AM | SK File | 5 KB |
| | CxrIM-iimykOu2yYd15YKwTW9sM-150702801.pid | 7/18/2012 9:52 AM | PID File | 1 KB |
| | CxrIM-iimykOu2yYd15YKwTW9sM-150702801-1342622208.sk | 7/19/2012 8:29 AM | SK File | 5 KB |
| | CxrIM-iimykOu2yYd15YKwTW9sM-151033755.pid | 7/24/2012 8:59 AM | PID File | 1 KB |
| | CxrIM-iimykOu2yYd15YKwTW9sM-151033755-1342703155.sk | 7/19/2012 12:05 PM | SK File | 5 KB |
| | CxrIM-iimykOu2yYd15YKwTW9sM-151101641.pid | 7/20/2012 1:43 PM | PID File | 1 KB |
| | CxrIM-iimykOu2yYd15YKwTW9sM-151475968.pid | 7/20/2012 2:55 PM | PID File | 1 KB |
| | CxrIM-iimykOu2yYd15YKwTW9sM-151475968-1342809003.sk | 7/20/2012 2:55 PM | SK File | 5 KB |
| | CxrIM-iimykOu2yYd15YKwTW9sM-152675244.pid | 7/25/2012 1:38 PM | PID File | 1 KB |

FIG. 5

Verification Workflow- Signature generation

Verification Workflow- Packet generation

SYSTEMS AND METHODS FOR DATA VERIFICATION AND REPLAY PREVENTION

CROSS-REFERENCE TO RELATED APPLICATIONS

The present application is a continuation of U.S. patent application Ser. No. 14/015,325 filed Aug. 30, 2013, entitled "Systems and Methods for Data Verification and Replay Prevention," which claims the benefit of U.S. Provisional Patent Application No. 61/695,972 filed Aug. 31, 2012, entitled "System and Method for Data Verification and Replay Prevention on an Open Network," both of which are hereby incorporated by reference in their entirety.

BACKGROUND OF THE INVENTION

The present invention generally relates to computerized data security and verification systems and methods. More particularly, the present invention relates to such systems and methods operating over a third party cloud-based storage application.

The "cloud" is a new model for distributed computing. The National Institute of Standards and Technology (NIST) defines "cloud computing" in the document titled "The NIST Definition of Cloud Computing" (NIST Special Publication 800-145, September, 2011) as "a model for enabling ubiquitous, convenient, on-demand network access to a shared pool of configurable computing resources (e.g., networks, servers, storage, applications and services) that may be rapidly provisioned and released with minimal management effort or service provider interaction."

Increasingly, electronic information that has been previously stored on local or network connected computing systems is moving to "cloud" storage systems. In addition to this movement of existing information to the cloud, users are creating vast amounts of new information placed directly into cloud storage. These cloud storage systems include information storage that is provided by service or storage providers such as Dropbox, Box, SugarSync, and the Microsoft Skydrive service. Other sources and providers of cloud storage exist.

Users of these services are provided authorized access to this storage after obtaining a subscription or membership offered to them by a storage provider. Alternatively, membership may be obtained in other ways. Upon obtaining a membership a user becomes a member. Storage is then accessible to members through the internet. However, the storage available through the internet is provided on an open network unprotected by the traditional perimeter defenses such as corporate firewalls, SSL connections, and access authentication mechanisms that may be used to protect local or network connected storage systems.

These open network storage systems provide only limited protections to users regarding the confidentiality or integrity of their information that they place onto these storage systems. For example, some storage systems may provide no protections at all. Further this information is often shared between multiple users that have all been granted membership access to the same stored information, giving rise to further security concerns.

Common methods in use today to protect access to information stored on open networks include basic authentication which relies on a user ID and password, or methods such as Oauth as presented by the OAuth group (www.o-auth.net) or OpenID as presented by the OpenID Foundation (www.openid.net). These methods may authenticate user and application identities but they do not directly authenticate user data files.

Other methods for information protection available today may provide some limited protections for the information stored on open networks. Some examples of other methods currently deployed are digital timestamps, digital signatures, or file and folder access permissions as may be in use today. For example, digital timestamps provide a way for determining the content of a file at a point in time. This method requires an available timestamping authority (TSA) or server to provide the digital timestamp. This method has a high degree of complexity and requires sufficient timestamp infrastructure to implement.

Digital signatures may provide a record of who applied a signature to a file, but digital signatures do not provide a way for establishing a time sequence or chronology and therefore may not maintain integrity over a time interval. Additional ways of protecting information such as setting file and folder access permissions may prevent access to a file on an open network, but today these methods may often be circumvented and they do not provide any way for data integrity or prevention of replay attacks.

Using these available methods, users must place their information onto these cloud storage systems at their own risk with no certainty that their information will not be intercepted or altered by unauthorized users. In the event that this information is improperly accessed or altered, in an unauthorized manner, the authorized users of this information may never detect that this information has been improperly accessed, or altered.

In some instances, encryption may be available to these users from the storage provider, by their own methods, or through other methods available to them for protecting information. This encryption may be applied to the files and other information placed into the cloud. However, the use of encryption, which makes information unreadable without the use of an electronic key, may not ensure that data has not been inappropriately accessed or altered. Electronic keys protecting encrypted information may be intercepted or in some cases even guessed allowing unauthorized users to access information they are not otherwise allowed to access.

Once this unauthorized access is obtained, the information may be used inappropriately, altered, and even re-encrypted by the unauthorized user without the knowledge of the authorized users. This may lead the authorized users to come to rely on this altered information as if it was correct, when actually it is not.

Further, the use of encryption does not prevent an unscrupulous member who is allowed access to information stored in the cloud from disregarding any rules established for accessing this stored information. The unscrupulous user may properly access this information, but then improperly use or alter this information to harm or deceive the other authorized members using and relying on the information.

Members accessing information stored in the cloud may not all be granted the same level of access to the shared storage. Shared open network storage may be owned, or managed by one or more members who are authorized to manage this information. A manager may also be referred to as a moderator. The moderator may accept, approve, or deny changes made to shared information by other members. The moderator may allow or deny other members access to shared information. Other members may be granted less or different access such as they may be able to read or copy information in or about the shared information storage, but they may not be allowed to decrypt or alter it, although they may copy and use that information in another private space that is separate from the shared access of the other members.

This type of access provides ways for an unscrupulous user to access appropriately validated information which they may copy to a private storage location that is not part of the shared member storage. The information may be considered valid for a defined period or interval of time after which the information is no longer to be considered valid. The unscrupulous user may attempt to present the data at a later time under the pretense that it is still valid data. Users unable to make a determination that the information should no longer be considered valid may mistakenly accept the data as still valid when in fact it should not be. This type of misrepresentation is referred to as a "replay" attack.

With regard to the operation of current cloud hosting or storage services, we will use as an example Dropbox, as provided by Dropbox, Inc. Dropbox is a cloud file storage service offered to users through a membership service. A user becomes a member by joining the service. Membership levels are provided at no cost. Additional membership levels are available and may require payment.

Upon membership, a new member is able to place files into the cloud storage provided to members. Members may create folders using familiar application programs such as the Microsoft Windows Explorer file manager. Files may be created and placed into these folders. These files and folders may then be accessible to a member from any device connected to the Dropbox storage for that member.

A capability of Dropbox storage is that file and folder access may be synchronized for almost immediate access from any of a members devices that may access Dropbox. A member may for example place a file into a folder within the Dropbox storage from the interface of a personal or laptop computer. That member may then access that file from a smart phone or tablet without having to perform a specific transfer operation using alternative methods including transfer programs such providing file transfer (FTP) or email (Microsoft Outlook), or that may require using physical media such as a USB or portable flash drive.

Using the Dropbox interface a member may designate that a folder be accessible to other members for purposes such as information exchange or collaboration. Making a folder accessible to other members provides a method for sharing information with members. A folder may be shared with many members. A limitation of products such as Dropbox is that any member may share a folder with any other member in such a way that not all members may know who has access to shared information. A member is unable to moderate access to shared information.

Sharing of information allows other members to receive access to folders to be shared. Sharing is initiated by a member by selecting or specifying other members who may access files or folders identified for sharing. Sharing selections may be made using the information displayed to a member within the user interface provided by Dropbox. A member may select that information not be shared.

A first user that shares a folder with a second member may not be aware that the second member is sharing that same folder with a third member. The first member may have intended for the information to be shared only with the second member. However, the first member may not prevent the third member from accessing the folder once the second member has shared the folder.

Information placed within the Dropbox storage may be encrypted by the Dropbox system. Files placed within Dropbox folders transfer across the open network through a secure network channel established by the Dropbox environment. This secure channel is implemented using the SSL protocol. This protocol may protect the files only as they move across the network connection between a member device and the Dropbox storage.

Protection is also provided for files while they are stored within the Dropbox storage. They are encrypted within the Dropbox storage using an encryption key maintained by Dropbox. This encryption key may be known by a member. This encryption key is also known by Dropbox, Inc.

A limitation of this protection is that a member no longer has sufficient control of their data even though it is encrypted within Dropbox storage. A breach of a Dropbox system that allows unauthorized access to encryption keys used to encrypt member information or a malicious act by a Dropbox staff member that gains access to an encryption key protecting a member file may place the information of a member at risk of unauthorized exposure.

BRIEF SUMMARY OF THE INVENTION

One or more embodiments of the present invention provide systems and methods to improve upon the secure sharing of information stored using cloud storage services by providing a system and method of data verification and replay protection for information stored on an open network. An exemplary embodiment using the Dropbox cloud storage service is presented below, but the present systems and methods may be performed on any cloud storage or hosting services such as, Box, SugarSync, and the Microsoft Skydrive service, for example.

As further discussed below, one or more embodiments of the present invention provide benefits such as: greater security and improved secure file sharing for information stored in the cloud, security through data integrity and data replay prevention, security for information stored in the cloud when none may otherwise be provided, security for information shared in the cloud when none may otherwise be provided, security for files on a device, security for files used with cloud storage applications, security for files using a method of secure folder replication, secure sharing of files on an open network from user devices, and secure sharing of files on local devices and file storage.

BRIEF DESCRIPTION OF THE DRAWINGS

FIG. 5 illustrates an example of the metadata files placed in the shared SFRS metadata folder by the SFDS.

FIG. 8 includes User A, User B, and the Dropbox cloud storage.

DETAILED DESCRIPTION OF THE INVENTION

Figure 1:
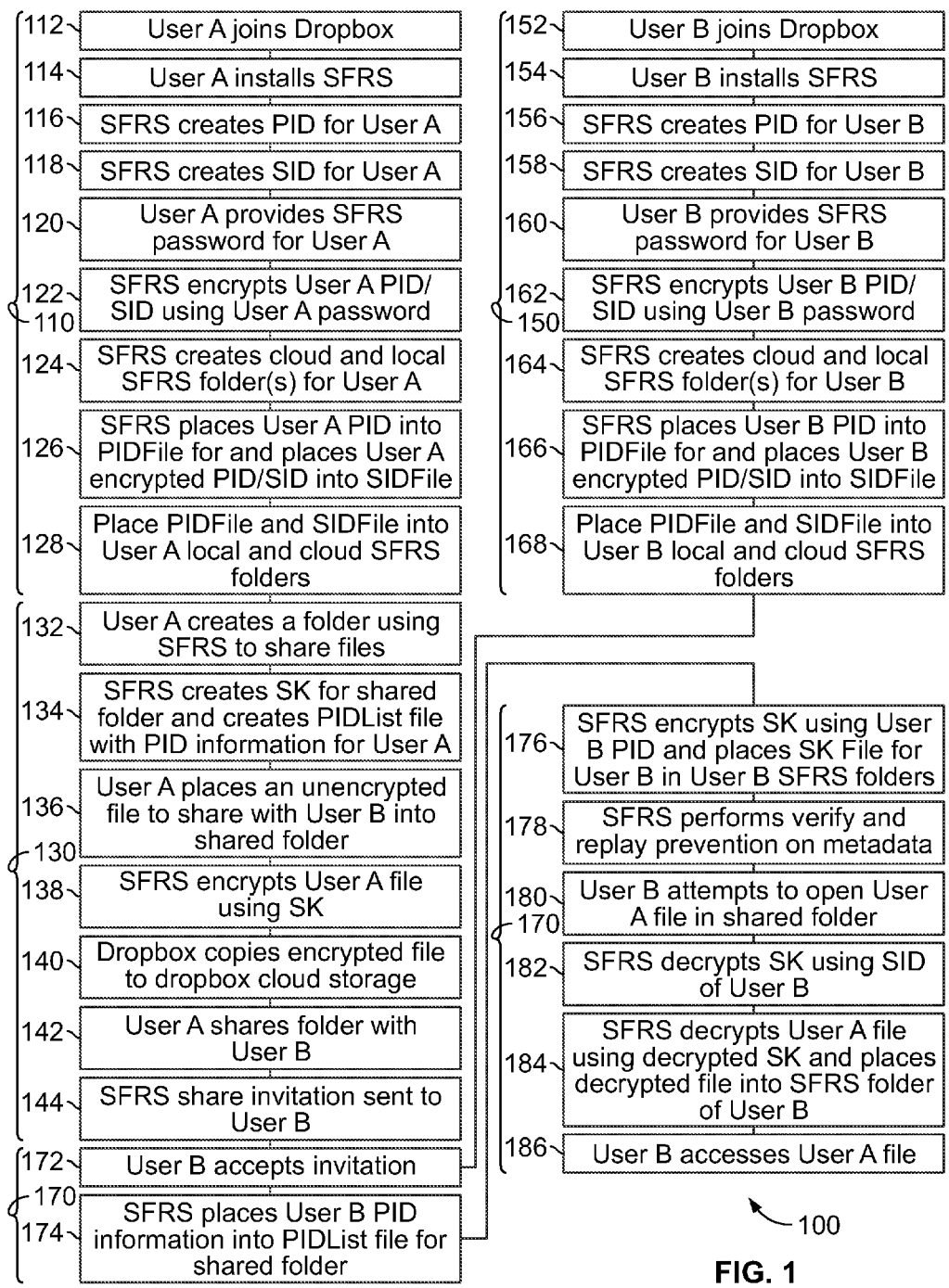
FIG. 1 illustrates a flowchart for using a Secure Folder Replication System (SFRS) according to an embodiment of the present invention.

FIG. 1 illustrates a flowchart 100 for using a Secure Folder Replication System (SFRS) according to an embodiment of the present invention. The flowchart 100 includes a User A setup section 110, a User A sharing section 130, a User B setup section 150, and a User B sharing section 170.

At the start of the User A setup section 110 at step 112, User A joins Dropbox. Next, at step 114, User A installs the SFRS on their computer. Next, at step 116, the SFRS creates a public key (PID) for User A. Then, at step 118, the SFRS creates a private key (SID) for User A. At step 120, User A provides the SFRS with a password for User A. Next, at step 122, the SFRS encrypts User A's PID and SID using the User A password.

Then, at step 124, the SFRS creates cloud and local .SFRS folders for User A. In one embodiment, the cloud folder may be created on the Dropbox. Additionally, the file extension .SFRS is indicates a file formatted by the SFRS and with a file name suffix established by the SFRS. The actual file name suffix may be something other than .SFRS, such as (in one example .VIIVO), for example.

Next, at step 126, the SFRS places User A's PID into a PIDFile and places User A's encrypted PID and SID into a SID File. Then, at step 128, the SFRS places the PIDFile and SIDFile into User A's local and cloud SFRS folders. User A has now been set up to use the SFRS and the SFRS is ready to receive and securely store files chosen by User A.

Turning now to the User B setup section 150, the User B setup section proceeds generally similarly to the User A Setup section 110. First, User B joins Dropbox at step 152. Next, at step 154, User B installs the SFRS on their computer. Next, at step 156, the SFRS creates a public key (PID) for User B. Then, at step 158, the SFRS creates a private key (SID) for User B. At step 160, User B provides the SFRS with a password for User B. Next, at step 162, the SFRS encrypts User B's PID and SID using the User B password.

Then, at step 164, the SFRS creates cloud and local .SFRS folders for User B. In one embodiment, the cloud folder may be created on the Dropbox. Additionally, the file extension .SFRS is indicates a file formatted by the SFRS and with a file name suffix established by the SFRS. The actual file name suffix may be something other than .SFRS, such as (in one example .VIIVO), for example.

Next, at step 166, the SFRS places User B's PID into a PIDFile and places User B's encrypted PID and SID into a SID File. Then, at step 168, the SFRS places the PIDFile and SIDFile into User B's local and cloud SFRS folders. User B has now been set up to use the SFRS and the SFRS is ready to receive and securely store files chosen by User B.

Turning now to the User A sharing section 130, User A now wants to securely share a file with User B using the SFRS. First, at step 132, User A creates a folder using the SFRS. The folder is indicated as a shared folder because User A desires to share the contents of the folder with User B. At step 134, the SFRS creates a Session Key (SK) for the shared folder. The SFRS also created a PIDList file with PID information for User A.

Then, at step 136, User A places an unencrypted file to share with User B into the shared folder. At step 138, the SFRS encrypts the file from User A using the SK to form an encrypted file. Then, at step 140 then encrypted file is transferred to Dropbox and Dropbox copies the encrypted file to Dropbox cloud storage.

Next, at step 142, User A shares the shared folder with User B using the folder sharing controls provided by Dropbox. Additionally, At step 144, the SFRS sends a share invitation to User B.

Turning now to the User B sharing section 170, at step 172, User B accepts the invitation made by the SFRS in step 144. Then, at step 174, the SFRS retrieves User B's PID information, for example from User B's PIDfile that was stored on the Dropbox application in step 168. The SFRS then places the User B PID information into a PIDList file for the shared folder.

Next, at step 176, the SFRS encrypts the SK for the folder using User B's PID and places a SK file for User B in User B's SFRS folders. Then, at step 178, the SFRS performs verify and replay prevention on metadata, as further described below.

Then, at step 180, User B attempts to open the file placed into the shared folder by User A. In response, the SFRS decrypts the SK using the SID of User B at step 182. Then, at step 184, the SFRS decrypts User A's file using the decrypted SK and places the decrypted file into the SFRS folder of User B. Finally, at step 186, User B accesses an unencrypted version of the file shared by User A.

As further discussed herein, the SFRS may be implemented within an application (app) running on one or more computing devices of members using Dropbox. One example of such an application is a SFRS application that may alternatively be referenced using the product name VIIVO. The SFRS provides a system and method for at least one user to protect files on at least one device of the user. Users of SFRS are subscribers, or members, of the Dropbox cloud storage service.

A first user, User A becomes a member of Dropbox. A second user, User B is also a member of Dropbox. Both User A and User B install Dropbox onto each device in their possession that may be be used with the Dropbox service. Both User A and User then install the software for the SFRS application. The SFRS application, during installation for each user, creates an encryption and decryption key pair for the user. A key pair may be a public/private key pair following the X.509 digital certificate standard. This standard defines a public key that is used during encryption operations on data and a private key that is used during decryption operations. A public key (PID) may also be used for authentication operations such as verifying a digital signature associated to a data file. A private key (SID) may also be used for operations of creating a digital signature associated to a data file.

Upon creation of a key pair for a user, the SFRS places the key pair into metadata files. Metadata files holding user keys are used within the operations performed by SFRS on behalf of a user when data encryption and data decryption occurs.

The SFRS prompts a user using a dialog provided through a user interface. The prompt then asks the user for a password. The SFRS application uses this password from the user to encrypt the users PID and SID into an encrypted SID file that are placed into the users SFRS folder(s).

The SFRS places the users PID into a PID file that are placed into the users SFRS folder. In addition to creating a user's key pair, the SFRS application locates the user's dropbox software. Metadata files are copied by the SFRS to the user's dropbox folder. SFRS then monitors the user's dropbox. A user may repeat the above operations on additional devices in the user's possession that are to be protected by the SFRS.

In one embodiment, a file to be placed into a user's dropbox folder may alternatively be placed by a user into their SFRS folder. Files may be placed using any methods available including copy, move, save or create a file. Files within a user's SFRS folder are detected by monitoring the SFRS folder. Upon detection, the SFRS encrypts a copy of a file using a user's PID and place the encrypted copy into the users dropbox folder. Files within a user's dropbox folder are also detected using monitoring. Upon detection, SFRS places a decrypted copy of the file into the users SFRS folder.

A user's files placed into the user's dropbox folder using SFRS are preferably encrypted within the dropbox cloud storage. Additionally, as described herein, files may be securely shared between one or more dropbox users. SFRS encrypts a file using a PID for each user allowed shared access. The SFRS uses a verification check workflow and replay prevention method to protect shared information from unauthorized use or access.

As an example, the SFRS operates on a computing platform of at least one member using Dropbox. The SFRS application monitors the information files shared by a member and between members using Dropbox and encrypts and decrypts each file for a member using an encryption key for the member. Monitoring may occur using a method of polling which inspects the contents of a folder or other location at defined intervals of time. Other methods of monitoring may be used.

A user of the SFRS application may interact with files (resources R) using any of a number of workflows described below. These files contain data of at least one user of the system. A user may perform the verification workflow or the replay check workflow when interacting with the files (resources R) of this system. The SFRS may perform the verification workflow or the replay check workflow when interacting with the files (resources R) of this system on behalf of a user of the system. The order of the workflows and the steps within a workflow may be altered from those presented here.

One embodiment of the present invention preferably includes at least one configurable folder that is monitored by the application software (SFRS). Such folder has a parallel folder maintained within the sharing service (one example is Dropbox)—this is identified as a cloud-replicated folder. A cloud-replicated folder is a folder provided and maintained by Dropbox storage.

In one embodiment, the SFRS software is such that the cloud-replicated folder(s) contain at least one encrypted file, and the monitored folder(s) managed by SFRS contain the decrypted copy (or copies) of the file(s). This file encryption and decryption occurs within the SFRS software application and it appears to members as though the encryption and decryption occur automatically and they are inconvenienced as little as possible when attempting to use their files.

At least one example may be if a member may use a standard file operation such as drag-and-drop to drag a file into, or alternatively directly writes a file, into a monitored folder, the SFRS software application of the current embodiment compresses and encrypts the file and places it in the corresponding cloud-replicated (Dropbox) folder. This functionality operates differently from Dropbox in that Dropbox may encrypt and copy the file to the Dropbox cloud storage, wherein one embodiment of the present invention may encrypt and copy to the user's local Dropbox folder. A benefit is the file is encrypted on the user's device using a key of the user before it is delivered to cloud storage and from there to other devices or to other users.

The encrypted format may be any encryption format. One example is the encrypted .ZIP format created using the SecureZIP software from the assignee of the present invention. Other encrypted formats may be used.

Multiple cloud replication services may be used simultaneously.

The SFRS extends the existing capabilities of Dropbox by offering transparent and secure access to encrypted shares using file tunnels.

Installing SFRS creates a new 'SFRS' folder in the user's Dropbox and on the user's workstation thus building a tunnel. This SFRS folder may be named VIIVO. This SFRS folder may be a folder within a root of the users file view, or it may be placed within another folder such as may be provided by the operating system on which SFRS is operating. For example, on a device or computing platform using the Microsoft Windows operating system, this folder may be located under the users AppData, or AppData\Roaming folder.

Adding files/folders to the local end of 'SFRS' tunnel automatically encrypts them with the user's unique encryption key and then uploads the secured data to the Dropbox storage, at the same time the encrypted content from the cloud is automatically downloaded, decrypted and instantly available in the local 'SFRS' folder. The encryption/decryption and data synchronization tasks are performed in the background making access to secure data nearly transparent for the users.

In addition to personal encryption, the SFRS also allows the users to secure new and existing Dropbox shares by encrypting shared data so that it's only accessible by a selected subset of SFRS users, or members.

Secure sharing with SFRS is easy and straightforward—the users do not need to remember passwords or manage encryption certificates. Shared data is encrypted/decrypted with a unique symmetric key (session key) for each share—automatically generated by the SFRS copy of share owner and securely distributed to the SFRS instances of share participants. With the session key available, all share members are able to access encrypted data transparently, using the 'SFRS' tunnel folder on their workstations.

The SFRS architecture is cloud-based, and encryption/decryption tasks are performed by the client applications on a member device. The application metadata (including, but not limited to user account details, keys, PID, SID, SMOD, OK_ID, .MOD, SK, JSON) are stored in the hidden folders ('(in one example .VIIVO)') within the user's Dropbox storage. Cross-client communication is performed using the Dropbox shares. Metadata files may reside in or be replicated between any of the folders managed by Dropbox or the SFRS.

Additionally, the SFRS operates on any computing platform, including Apple, Windows, and Unix.

The SFRS application utilizes the Dropbox application for synchronization of encrypted data with cloud folder and may use the Dropbox API (an application programming interface provided by Dropbox) for metadata manipulations. Encryption or decryption operations of data and metadata may be performed using another API providing encryption such as the SecureZIP SDK by the assignee of the present invention or using the open source API such as is available from www.openssl.org.

As used in one or more embodiments, some frequently used terms may include:

SFRS Tunnel—The SFRS tunnel may be pair of SFRS folders including a cloud-end or outside of the tunnel and a local end or device side of the tunnel. The cloud-end may be a SFRS folder in the root of a user's Dropbox, and stores the encrypted files. The local end may be a SFRS folder on the user's device, and contains the files already decrypted by SFRS. The SFRS provides secure storage and sharing for files and folders within the tunnel, and folders outside of it are ignored. As a result, the tunnel includes both the user's private content folders and any Dropbox shares secured by SFRS.

Session Key or SK—The SK may be a symmetric or asymmetric key used to encrypt/decrypt data. The SFRS may use two types of SKs, the Private SK and the Folder SK. The Private SK is a key that may be used to encrypt unshared data in a SFRS tunnel, and may be unique for each user. The Folder SK is a key used to encrypt the data within a shared folder, and may be unique for each shared folder.

Private folder—The private folder may be a folder encrypted with a private SK.

Shared folder—The shared folder or the SFRS share may be a shared folder in Dropbox encrypted by SFRS. It may be read-only (subscribe only) or read-write. A share corresponds to a folder and sub-folders it contains. The same settings and rules are applied to all sub-folders within a share. Similar to Dropbox, a share in SFRS maynot include other shares and may not be included in other shares.

Uninitialized share—The uninitialized share may be a shared folder in Dropbox, for which the sharing process is not yet complete and/or for which folder metadata is not yet available.

Identity—With regard to identity, the SFRS identifies each user using a pair of keys unique to a user: the PID—the user's public key, and the SID—the user's private key. The SID/PID key pair for a user is generated as the SFRS application is initialized on a user device. It is associated with the user's Dropbox account and may be stored in the user's cloud cache.

SID file—The SID/PID pair is stored in the cloud cache within an SID file. The SID file may be a password protected file containing the user's private and public key.

PID file—The PID file may be the file containing the user's PID, name, e-mail and other public information for the user.

Cloud cache—The cloud cache may be a named folder with an extension unique to the SFRS application. One example is a folder having a (in one example .VIIVO)' name extension located within the root of the user's Dropbox—this folder is used to cache the user's account details (including but not limited to SID, PID, SMOD, SK, OK_ID, .MOD and other information) and metadata from the folders shared with the user in order to ensure synchronization of the metadata across the user's multiple client apps and prevent data loss during re-installation.

Moderator—The moderator is the user who has created the SFRS Share. The moderator's instance of SFRS generates the SK for the shared folder, encrypts the data in the folder, generates folder metadata required for sharing and then distributes the SK to the share participants. In one embodiment, the moderator is the only person who may grant keys to the share and change share settings. In one embodiment, the other share participants may only access the shared files—read or read/write, depending on the folder's access level set by the moderator.

Folder Metadata—Folder meta data may be at least one file of metadata, generated by the moderator and used for secure sharing of the folder with SFRS. The folder metadata may include:

PIDlist—The PIDlist may be the list of SFRS users (PIDs) that are allowed to access the folder.

SMOD—The SMOD may be a file with share folder properties (access level, read-only, retain/keep files, operating system or device information, URL, date, time, timestamp, owner, allowed users, size, version, location, file name, and other properties).

OK_ID—The OK_ID may contain the Dropbox ID.

.MOD—The .MOD contains moderator control information

Blacklist—The blacklist may be a list of users that were backlisted and may not have access for this folder even if they have obtained the key.

In one embodiment, the folder metadata is located in a hidden '(in one example .VIIVO)' sub-folder of the shared folder. This folder may also be a non-hidden folder. In one embodiment, folder metadata is created by SFRS and signed on behalf of the moderator. These metadata files are preferably not removed from the shared folder. If an event causes these files to be removed or damaged, SFRS operation may block access to the folder until the metadata is restored by the actions of a moderator.

Share invitation—The share action may be an action by, or on behalf of the moderator of sharing a folder with at least one member. Shared information is secured by SFRS. A method of providing an invitation to a member to access the shared folder is provided. Sending an email is one example.

Request Access—When a SFRS application detects a SFRS share for which an encryption/decryption key is not known, the SFRS application uploads a PID file to the shared folder. The request for access may be part of the grant access procedure described below.

Grant Access—When a SFRS application detects a new PID file in a moderated share, the SFRS application interprets the presence of the new PID file as a request by a member to access the share. If access to the share by the member is granted by a moderator or on behalf of a moderator, the SFRS application, generates and copies an SK file for the PID owner.

SK file—The SK file is a file within which the shared folder's SK is asymmetrically encrypted using an allowed members PID. The SK file may be uploaded by the moderator. The SK file may be acquired and then removed by the allowed member, and is cached in the allowed members cloud cache.

Identity check/validation—Within operation of the system, an action may occur where a first user, User A, may perform a sequence of steps needed to validate the identity of a second user. The sequence of steps performed to confirm the identity of User B include User A sending a specific challenge message to User B and checking their response is the correct response for User B. Typically, the correct response was information communicated secretly in advance between User A and User B separate from the SFRS application. This information may have been exchanged using email, telephone, face-to-face, or by other methods of exchanging information.

The sequence of steps using a challenge and a response validation may be performed when a User B seeks to establish a new sharing relationship with User A. One example may occur when User B may attempt to access a folder of an unknown moderator, User A. Another example may occur when a moderator, User A, sends a sharing invitation to an unknown user, User B.

The information used to perform challenge/response sequence may be communicated using the SFRS. The sequence may include uploading a signed and encrypted CLG file to the shared folder accessible by both User A and User B using Dropbox.

If User A successfully validates the identity of User B, User A may then include User B within a list of trusted users. A list of trusted users is maintained with the cloud cache.

Known users—Known users may be other users with whom a user has had successful sharing relationship in the past. A list of Known users is maintained in the cloud cache and is modified whenever one user may grant or may request folder access to or from another user.

Revoke PID—The revoke PID is an action a user may take to invalidate/remove their own PID from any shares with which it is associated. This action may be performed as a result of the PID being compromised, for example. If a PID is compromised by a malicious user, or by some other action the information that may be access using the PID may become at risk of exposure. The SFRS application that may attempt to use a revoked PID may be blocked until a new PID is generated.

Exclude from share—The exclude from hare may be an action performed by, or on behalf of, a moderator of a share to remove another user from access to a share. Exclusion occurs by generating a new session key for the share, and optionally re-encrypting all data within the share using the new session key.

Unshare—The unshared may be an action performed by, or on behalf of a moderator of a share excluding all other users from the share. Unsharing may include re-encrypting all data within the share using a private key.

Moderator lock—The moderator lock may be a way for a moderator to prevent access to a shared folder thereby locking out other members for some duration. For example, a moderator lock state may be achieved using a file designed as a lock file placed into a shared folder. The lock file may be placed by the moderator's SFRS application. A lock state may be placed by, or on behalf of, a moderator in order to eliminate synchronization conflicts during metadata updates or to limit access to shared folders during re-encryption. A moderator lock may be used for other reasons when access to a shared folder may need to be prevented for some duration.

De-verify PID/Blacklisting—The de-verify PID/blacklisting may be the act by any user of terminating all share relationship with any other user by adding the de-verified user to the blacklist A blacklist may be established using a mechanism such as a file into which the name or other identity information of the de-verified user is placed. Operations performed by the SFRS application check if a user is identified within the blacklist and if found, the operation involving the blacklisted user is not performed.

Figure 2:
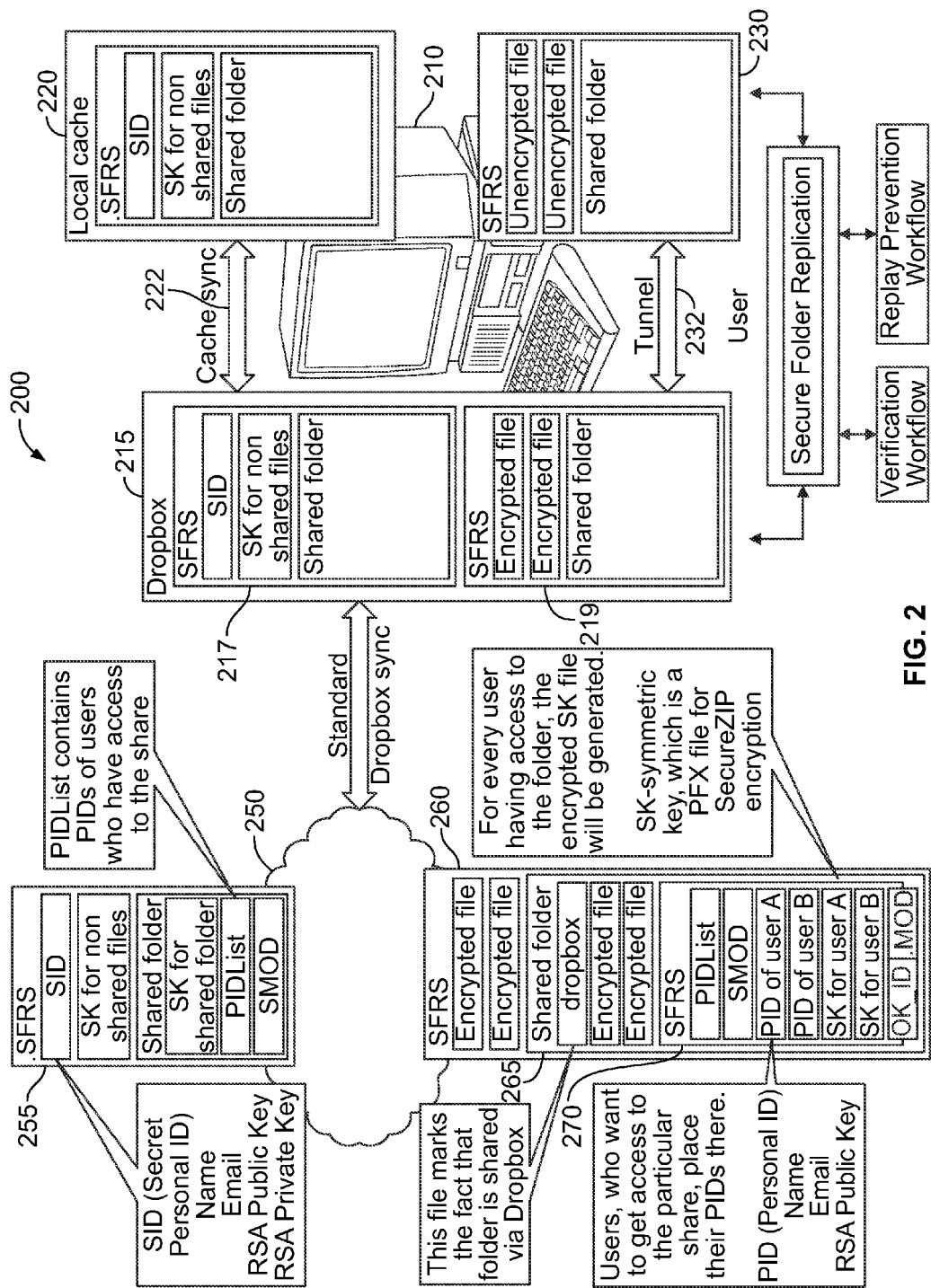
FIG. 2 illustrates an embodiment of a cloud-based computer hardware architecture for implementing the SFRS of FIG. 1.

FIG. 2 illustrates an embodiment of a cloud-based computer hardware architecture 200 for implementing the SFRS of FIG. 1. As shown in FIG. 2, a user computer 210 is connected to a computerized cloud-based storage 250. The under computer 210 includes a local cache 220 and an SFRS application folder 230. The local cache 220 includes the SID for the user and a SK for non-shared files as well as a shared folder. The local cache 220 is connected to the Dropbox application folder 215 using a cache sync 222.

The SFRS application folder 230 includes one or more unencrypted files and a shared folder. The SFRS application folder communicates with the Dropbox application folder 215 using a data tunnel 232.

The Dropbox application folder 215 includes SFRS metadata 217 including a SID for the user of the computer and the SK for non-shared files, which appear in the shared folder. Additionally, the Dropbox application folder 215 includes a Dropbox SFRS folder 219 which contains one or more encrypted files.

The Dropbox application folder 215 is preferably local to the user computer 210 and operates as a pass-through for the SFRS as described above. For example, as described above, the user may place a file in the SFRS application folder 230 and the SFRS application automatically encrypts the file and passes it through the tunnel 232 to the local Dropbox SFRS folder.

Additionally, the contents of the Dropbox application folder 215 are automatically passed through the standard Dropbox sync to the Dropbox computerized cloud-based storage 250. The cloud-based storage includes SFRS metadata folder 255 including a SID for the folder and the SK for non-shared filed. Additionally, for the shared folder, it includes the SK for the shared folder, a PIDList, and a SMOD file as described below. The SID may also be called a Secret Personal ID and may include the user's name, e-mail, RSA public key, and/or RSA private key. Also, the PIDList contains the PIDs of users who have access to the shared folder.

Also, the cloud-based storage 250 includes a cloud SFRS folder 260. The cloud SFRS folder 260 includes a shared folder 265. The shared folder 265 includes a shared SFRS metadata folder 270. The cloud SFRS folder 260 may include encrypted files. Additionally, the shared folder 265 may include a .dropbox file indicating that the folder is shared using Dropbox. Additionally, the cloud SFRS folder 260 may include encrypted files. The shared SFRS metadata folder 270 includes a PIDList, a SMOD file, PIDs of the users having access to the encrypted files, SKs for the users having access to the encrypted files, an OK_ID indicator, and a .MOD file as described below.

The PIDs may be a personal ID that may include the user's name, e-mail and/or RSA public key. Additionally, the SK may be a symmetric key, such a s PFX file for SecureZIP encryption. The SK may also be an asymmetric key/

As shown in FIG. 2, and described further below, the secure folder replication functions operate on the user's computer 210 between the SFRS application folder 230 and the Dropbox application folder 215.

Figure 3:
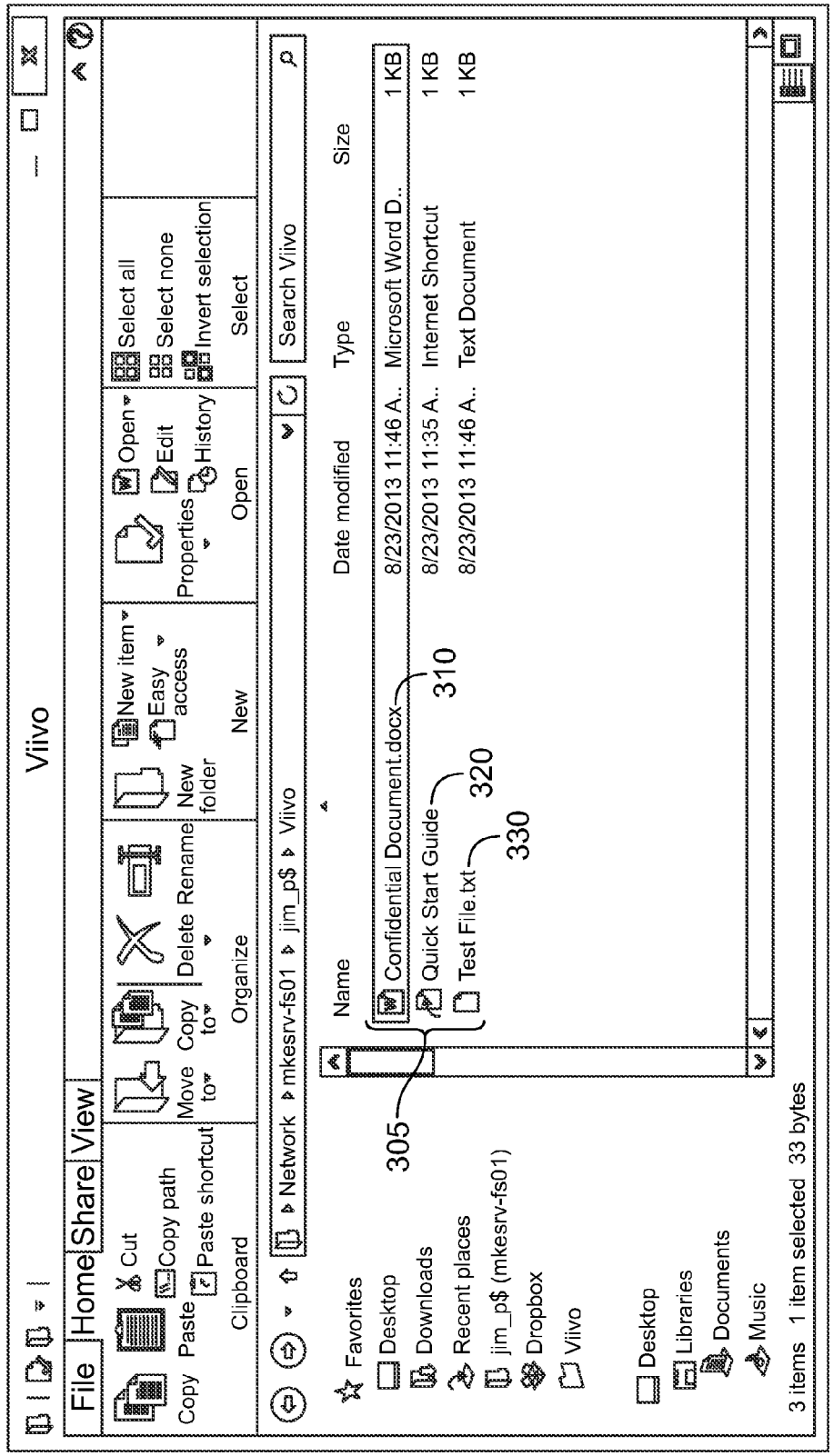
FIG. 3 is an illustration of an embodiment of the SFRS folder as it may appear to a user at the computer of FIG. 2.

FIG. 3 is an illustration of an embodiment of the SFRS folder as it may appear to a user at the computer 210 of FIG. 2. As seen in FIG. 3, the SFRS folder includes an exemplary folder listing 305 including a Microsoft Word file 310, a URL file 320, and a text file 330. Additionally, the files are displayed to a user in unencrypted form and are ready to be used by the user.

Figure 4:
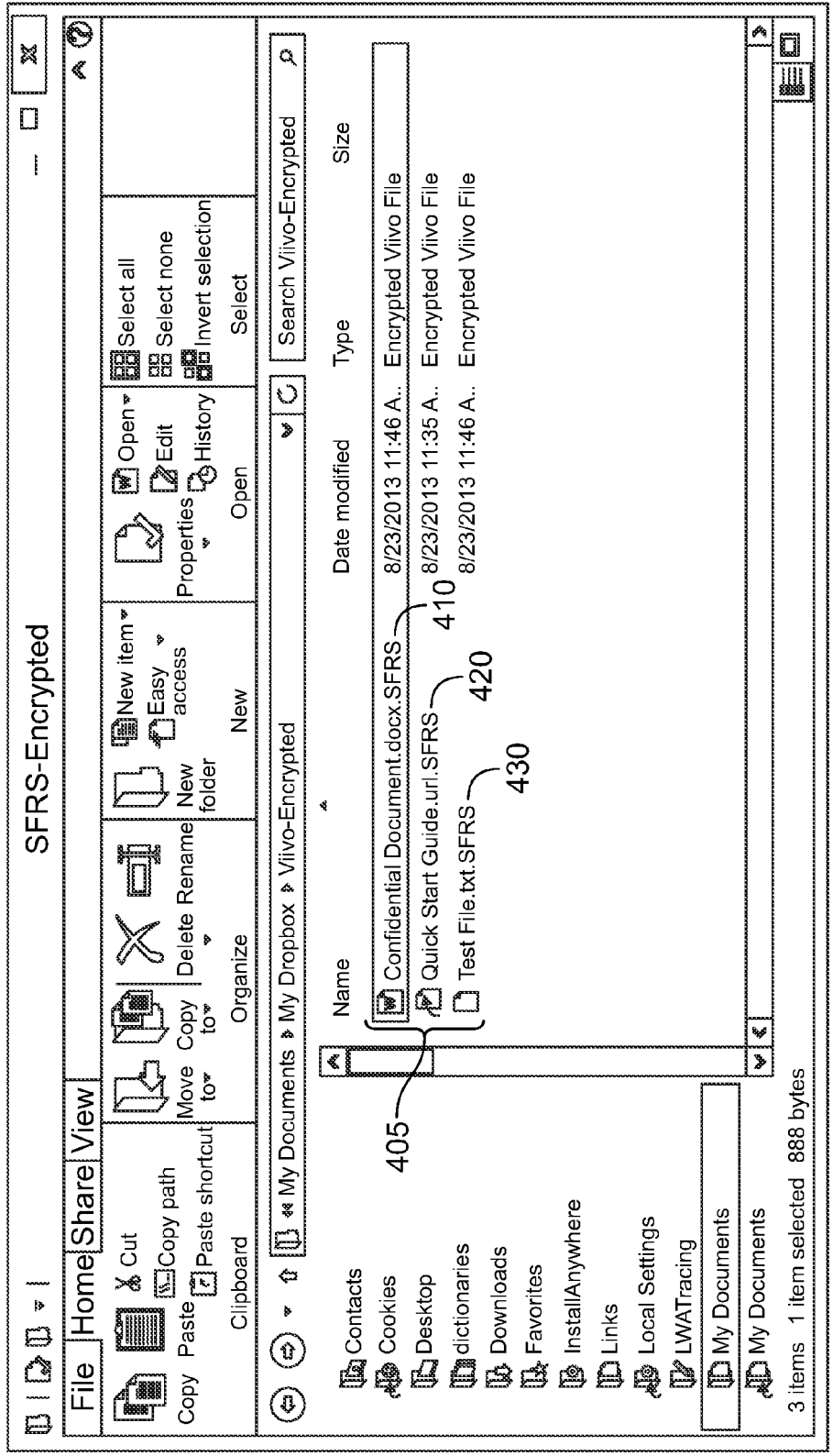
FIG. 4 is an illustration of an embodiment of the encrypted Dropbox folder as it may appear to a user at the computer of FIG. 2 or at the cloud-based storage.

FIG. 4 is an illustration of an embodiment of the encrypted Dropbox folder as it may appear to a user at the computer 210 of FIG. 2 or at the cloud-based storage 250. As seen in FIG. 4, the encrypted Dropbox folder includes an exemplary folder listing 405 including an encrypted versions of the Microsoft Word file 410, URL file 420, and text file 430. Additionally, the files are only displayed to the user in encrypted form and are decrypted before being used.

FIG. 5 illustrates an example of the metadata files placed in the shared SFRS metadata folder 270 by the SFDS. As shown in FIG. 5, the shared SFRS metadata folder 270 includes a plurality of PID files 510, SK files 520, and a SID file 530.

Figure 6:
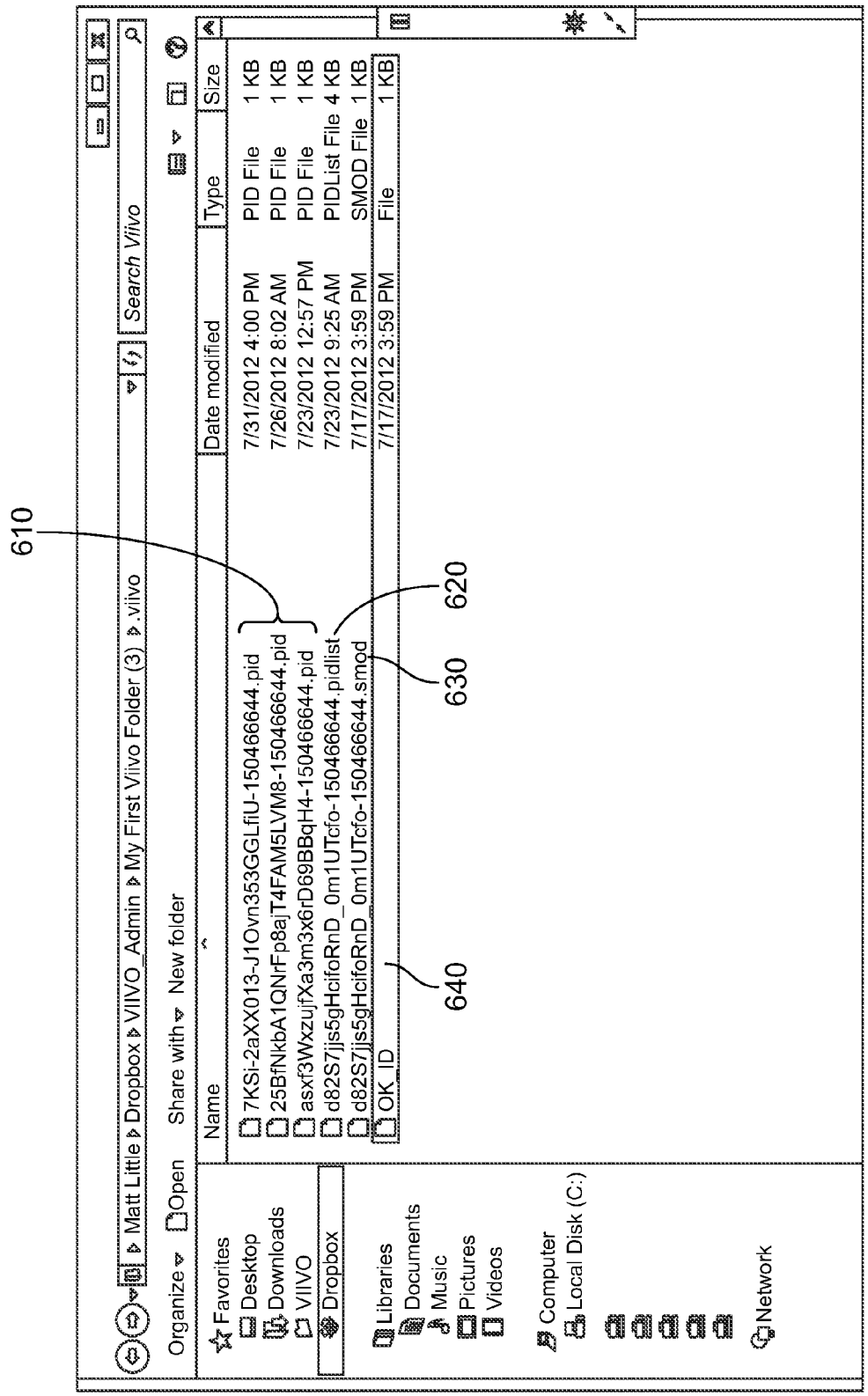
FIG. 6 illustrates an example of the metadata files placed in the SFRS metadata folder.

FIG. 6 illustrates an example of the metadata files placed in the SFRS metadata folder 255. As shown in FIG. 6, the SFRS metadata folder 255 includes a plurality of PIDs 610, typically for a number of users, as well as a PIDList 620, a SMOD file 640 and an OK_ID indicator 640.

Figure 7:
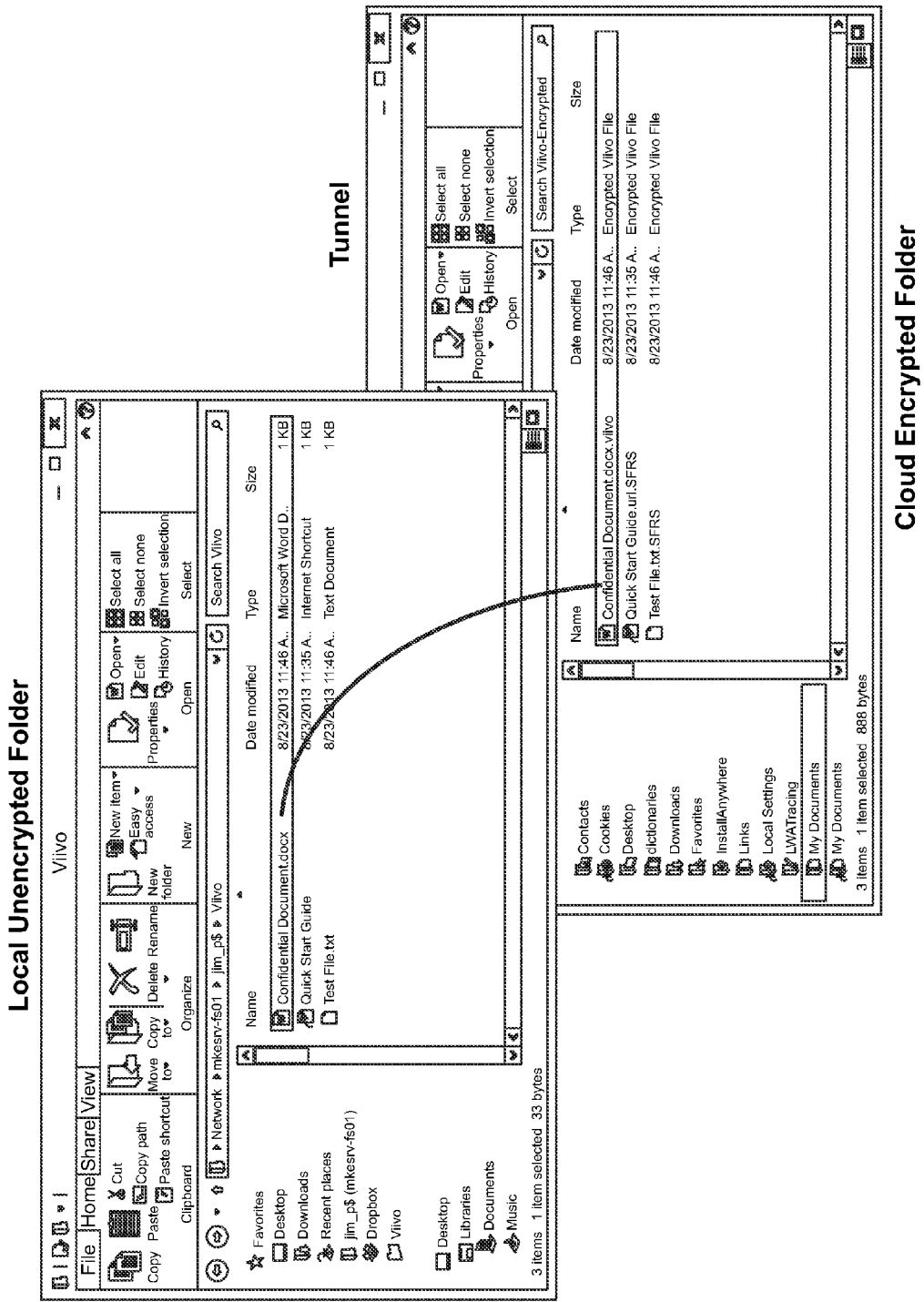
FIG. 7 illustrates the tunnel between the SFRS folder as it may appear to a user at the computer of FIG. 2 and the encrypted Dropbox folder as it may appear to a user at the computer of FIG. 2.

FIG. 7 illustrates the tunnel 232 between the SFRS folder as it may appear to a user at the computer 210 of FIG. 2 and the encrypted Dropbox folder as it may appear to a user at the computer 210 of FIG. 2.

Figure 8:
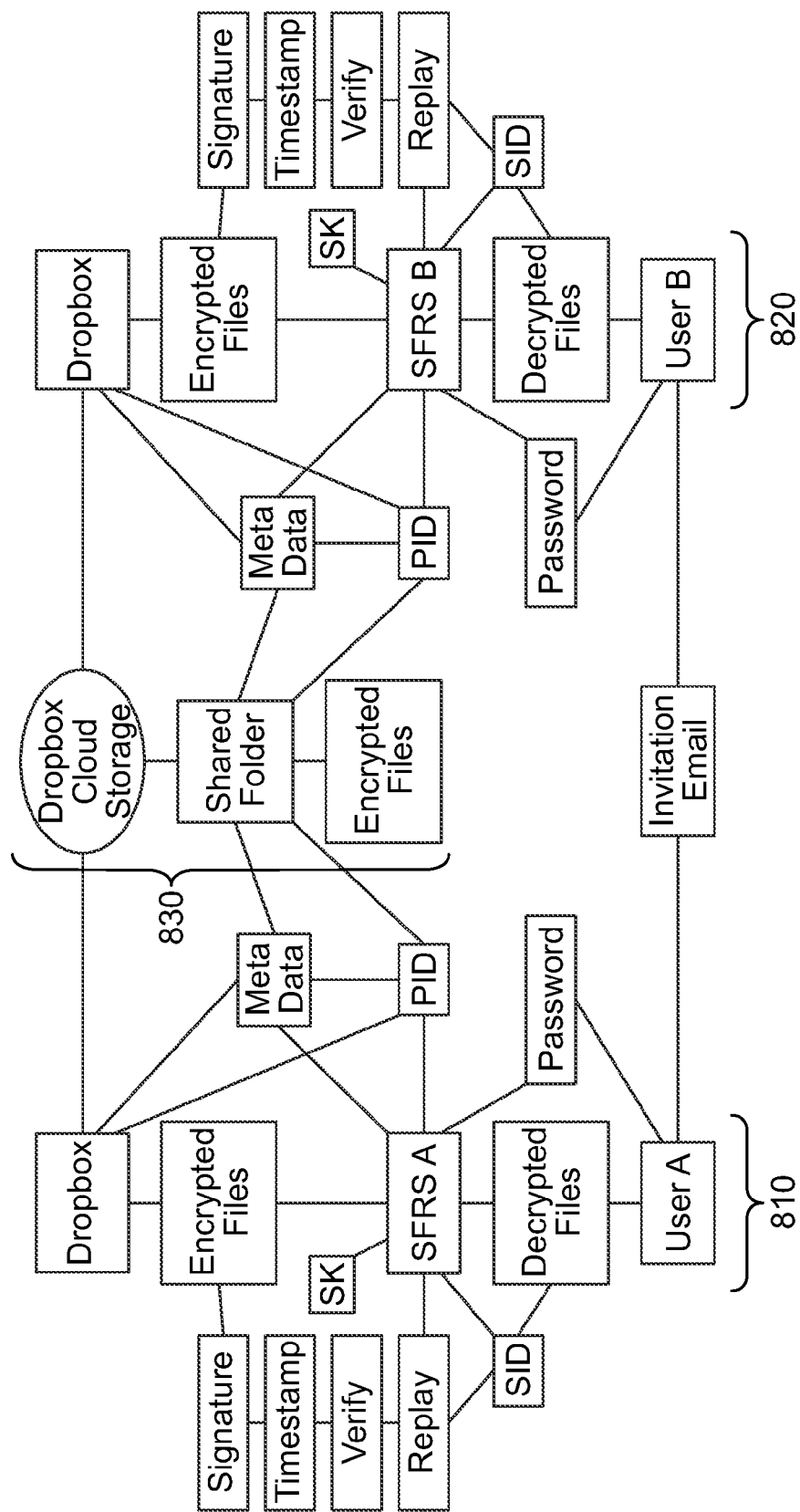
FIG. 8 illustrates the information passed by the SFRS in operation.

FIG. 8 illustrates the information passed by the SFRS in operation. FIG. 8 includes a User A 810, a User B 820, and a Dropbox cloud storage 830. As shown in FIG. 8, User A may enter a password into the SFRS that is operating on their local computer. Additionally, User A may provide decrypted files to the SFRS A and may send an invitation e-mail to User B inviting User B to share in the shared folder once it is established.

User A's SFRS A receives decrypted files, PID, metadata, SID, and SK determined locally and provides the encrypted filed PID and metadata to the local dropbox folder, which then passes them to the dropbox cloud storage 830. The Dropbox cloud storage includes the shared folder with the encrypted files.

User B operates similarly to User A. That is, User B's SFRS B may receive decrypted files, PID, metadata, SID, and SK determined locally and provides the encrypted filed PID and metadata to the local dropbox folder, which then passes them to the dropbox cloud storage 830.

Once User B has responded to User A's e-mail, preferably both User A's and User B's SFRSs may access the encrypted files stored at the dropbox cloud storage 830, decrypt them, and display the files for the respective user.

Figure 9:
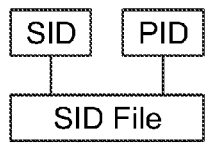
FIG. 9 illustrates the creation of the SIDfile metadata from the SID and the PID as discussed herein.

FIG. 9 illustrates the creation of the SIDfile metadata from the SID and the PID as discussed herein.

Figure 10:
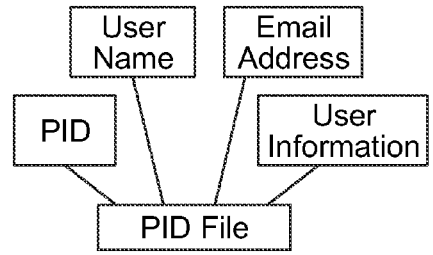
FIG. 10 illustrates the creation of the PIDFile metadata from the PID, a user name, an e-mail address, and user information, as discussed herein.

FIG. 10 illustrates the creation of the PIDFile metadata from the PID, a user name, an e-mail address, and user information, as discussed herein.

Figure 11:
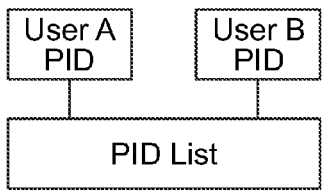
FIG. 11 illustrates the creation of the shared key PIDList from the User A PID and the User B PID as discussed herein.

FIG. 11 illustrates the creation of the shared key PIDList from the User A PID and the User B PID as discussed herein.

Figure 12:
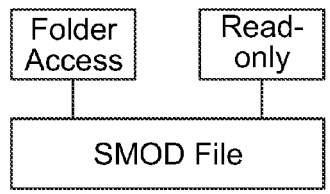
FIG. 12 illustrates the creation of the .SMOD folder access file from a folder access decision for one or more specific users and a read-only decision for one or more specific users as discussed herein.

FIG. 12 illustrates the creation of the .SMOD folder access file from a folder access decision for one or more specific users and a read-only decision for one or more specific users as discussed herein.

Figure 13:
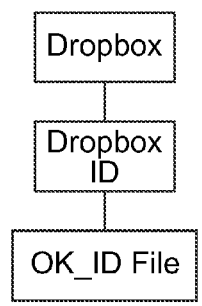
FIG. 13 illustrates the creation of the OK_ID file from an identification that the cloud storage system that is being used is Dropbox, which is related to a Dropbox ID code, which is then placed in the OK_ID file.

FIG. 13 illustrates the creation of the OK_ID file from an identification that the cloud storage system that is being used is Dropbox, which is related to a Dropbox ID code, which is then placed in the OK_ID file.

Figure 14:
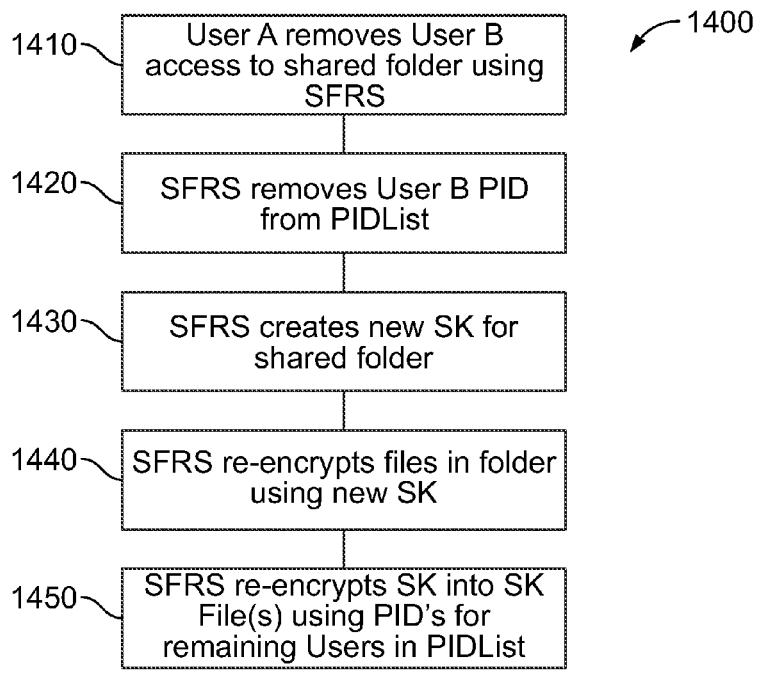
FIG. 14 illustrates a flowchart of a method for removing a user from a shared folder.

FIG. 14 illustrates a flowchart 1400 of a method for removing a user from a shared folder. First, at step 1410, User A initiates the removal of User B's access to the shared folder using the SFRS. At step 1420, the SFRS removes the User B PID from the PIDList for the shared folder. Next, at step 1430, the SFRS creates a new SK for the shared folder. Then, at step 1440, the SFRS re-encrypts the files in the formerly shared folder using the new SK. Finally, at step 1450, the SFRS re-encrypts the SK into the SK File using PIDs for the remaining users in the PIDList.

Figure 15:
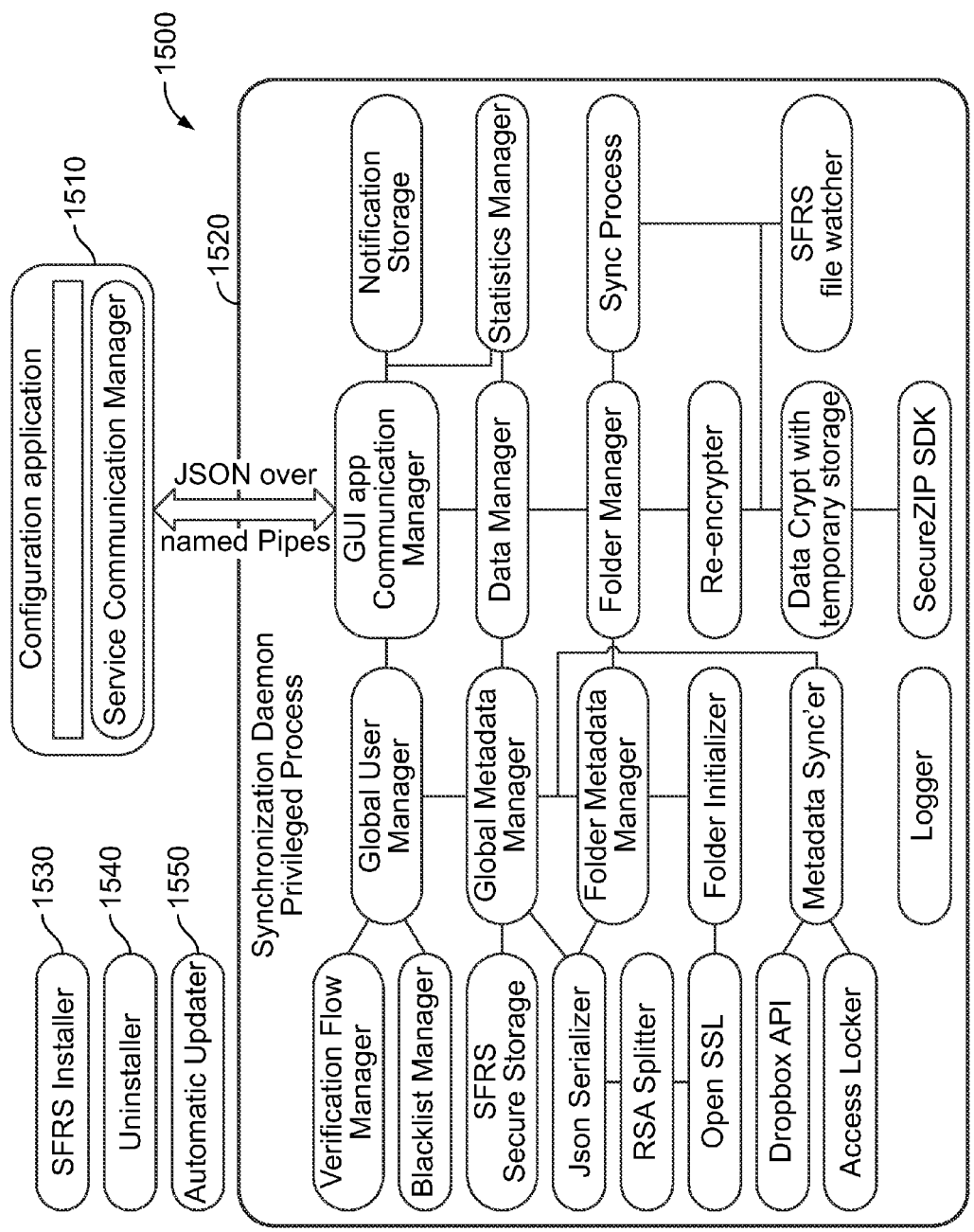
FIG. 15 illustrates the software components of one embodiment of the SFRS.

FIG. 15 illustrates the software components 1500 of one embodiment of the SFRS. The software components 1500 include the GUI configuration manager 1510, the synchronization daemon 1520, the SFRS installer 1520, the SFRS uninstaller 1540, and the SFRS automatic updater 1550.

The GUI configuration manager 1510 in one embodiment is the component responsible for display of the configuration GUI components to the user. The GUI configuration manager 1510 communicates with the background process over named pipes to get/set necessary data. Other types of inter-process communication may be used including FIFO's. This component may not have direct access to metadata/user data.

The synchronization daemon 1520 is responsible for handling encrypted user data and different encrypted metadata. The components of the synchronization daemon 1520 application are described in more detail below.

Logger—The Logger may be accessed by other components of the background daemon and is responsible to output the logs of the user activities (and SFRS activities not initiated by the user) in the pre-defined format. Several log levels are supported, and in one embodiment logs are output unstructured in a plain-text file.

Statistics Manager—The statistics manager stores statistical data for different SFRS operations. It also implements API to enable queries for statistical data to be displayed in the SFRS UI.

Notification Storage—The notification storage component is responsible for collection of notification information to be displayed to the user. Notifications stored in the notification manager may not be persistent, and they may not survive daemon restart. After the daemon is restarted, the necessary notifications may be regenerated based on the analysis of SFRS structures/files, for example.

Data Manager—The data manager is a high-level component for datafile operations performed by SFRS daemon. Using the data manager, different user-initiated operations may be started (for example, re-encrypt) or the status of background sync processes may be queried. The data manager may interact with the Metadata manager to perform its functions.

Folder Manager—The folder manager is responsible for data file operations taking place within a particular folder. It interacts with the Folder Metadata manager to get access to the metadata related to a particular folder.

Sync Process—The sync process implements logic of periodic sync between the inside and outside ends of SFRS tunnel.

Re-encrypter—The re-encrypter is responsible for the initial encryption of the data in the SFRS folder and/or on-demand re-encryption of the data.

Data Crypt with Temporary Storage—The data crypt with temporary storage component is responsible for atomic encryption operations with the data saved in the temporary storage in the process of encryption. This component directly interacts with the SecureZIP SDK for data encryption.

Global User Manager—The global user manager is a high-level component for user-management related operation and querying the global user-related information. In one embodiment, it has two subcomponents: verification flow manager (component responsible for the state machine logic of the PID verification workflow) and the blacklist manager (responsible for management of the folder-unspecific PID blacklist).

Global Metadata Manager—The global metadata manager is a high-level component responsible for metadata modification operation and accessing data stored in the metadata files.

JSON serializer/RSA Splitter/Open SSL—These are low level components responsible for storage of the metadata in the JSON format, signing, splitting of the metadata files into blocks corresponding to the used RSA key size and writing the encrypted data to the drive using openSSL. The reverse operations, responsible for reading of encrypted metadata structures from drive are also implemented in these components.

Folder Metadata Manager—The folder metadata manager is responsible for access and modifications of metadata associated with a particular folder, including PIDLIST management.

Folder Initializer—The folder initializer is responsible for initialization of the folder structures for the new folder.

Metadata Sync'er (with Access Locker and Dropbox API)—These components are responsible for metadata sync logic between cloud and local storages using the Dropbox API. This component also implements the logic for modification lock files.

Verification and Replay Prevention

Multiple members may have access to an open network resource over a given interval of time. A member may be a computer user or other entity using the open network resource. An example of an open network resource may be a file shared by members on a network such as the public internet. In one or more embodiments, members introduce data into the resource at various subintervals and ensure that (a) the data presented is authentic and verifiable, and that (b) it is not replayed from an earlier subinterval, wherein the data from that interval is also verifiable.

This method is useful, for instance, in the case where time-based directives are communicated to members over a shared resource, and those directives, while uniform, may change over time. For example, subsequent directives may overwrite directives from a previous subinterval, although both directives are 'verifiable'. Members may copy these directives out of the shared resource into a private space during any subinterval, and replay them later.

An example of the use of directives may be, but is not limited to, encrypted data shared between some members of a network resource, where the encrypted data indicates shared moderator events regarding the resource. All members of the resource may access the moderator packets at any time, even non-moderators, but only moderators may decrypt the packet data. Any member may make copies of the moderator directives, and could later replay the old directive in order to try and confuse moderation or perform an exploit. Using the method described below, it may be ensured that no previous moderator event may be replayed in this manner.

The following example demonstrates one method in which arbitrary data is verified and protected against replay in a shared resource. In the example JSON is used for the data packet, but this is only for convenience and illustrative purposes. This method may be applied to other data.

Data Sample

Below is a sample JSON data packet that may be placed into the shared resource by a member.

```
{
"data" : "Lorem ipsum dolor sit amet, consectetur adipisicing ...",
"timestamp" : 1336747328,
"signature" : "J0dDBo ... wQq5=="
}
```

In addition to the data field, a timestamp and signature field are added to the packet. The timestamp is based on epoch in this case, but may be any valid date/time format, or even a simple incrementing counter. Other sequential values may be used. The signature field is preferably a Base64 encoded binary value, but may be any valid binary authentication value.

Verification

The signature field is generated based on the data and timestamp fields, using the member's private RSA key, prior to placing the data into the shared resource. Receiving members may verify the data from signature using the sending member's public key.

Verification Workflow

First, User A wants to add data to a shared network resource R.

Second, A notes the current time t in seconds from the epoch.

Third, using his private RSA key, A generates the signature field based on data and t. For example, signature=RSA encrypt(data, t).

Fourth A combines data, t, and signature into a packet and places in R.

Fifth, User B knows the public key for A and verifies data and t from the packet discovered in R. For example, (data, t)=RSA decrypt(signature).

Sixth, if the above check fails, the packet is not authentic and is rejected.

Replay Prevention

The timestamp is used to employ a simple logic operation protecting against a replay attack. One example of a replay attack occurs when one user places old, but still verifiable data into the shared resource. A second user may detect this attempt to reuse old data. After completing the verification step above the timestamp is compared against the second user's locally cached timestamp for that data. The timestamp must never be older than the locally cached timestamp.

Replay Check Workflow

First, User B verifies data packet from user A in R and finds that it is authentic (see Verification above)

Second, B checks for a locally cached timestamp $t_0$ referencing data. If $t_0$ is not found, B accepts the data from A and B writes timestamp t from the packet to locally cached $t_0$. Otherwise, if $t_0$ is found locally and is more recent than t from packet, B rejects the data as a replay attack. That is, $t_0$ must be <t in order to be accepted. Thus, even a simple incrementing counter could be used instead of timestamp.

Finally, if verifies and most recent, B accepts the data and writes t from data packet to locally cached $t_0$ Alternative Verification Method The following workflow presents an alternate verification method using a password. This alternative method achieves the same result as that described above. For example, this method may be used between a single member who has multiple devices accessing the shared resource and who does not care whether other members may verify against replay. An advantage of this method over the method above is that it just requires a one-way hash function, which may be more readily available than public/private key encryption on some platforms. One example of a one-way hash function that may be used is the Secure Hash Algorithm (i.e. SHA-256 or SHA-512) published by the National Institute of Standards and Technology (NIST).

First, User A knows a password p and wants to transfer data using the shared resource.

Second, A notes the current time t based on epoch.

Third, using a one-way hash, A generates a signature based on t, p, and data. For example, signature=SHA256(t, p, data).

Fourth, A places the data packet with signature and t in the shared resource.

Fifth, a receiving user knowing p may verify the data from the packet using the one-way hash. For example, signature (from packet)=SHA256(t, p, data).

Sixth, if the verification hash succeeds, the receiving user may perform the replay check as described above.

Figure 16:
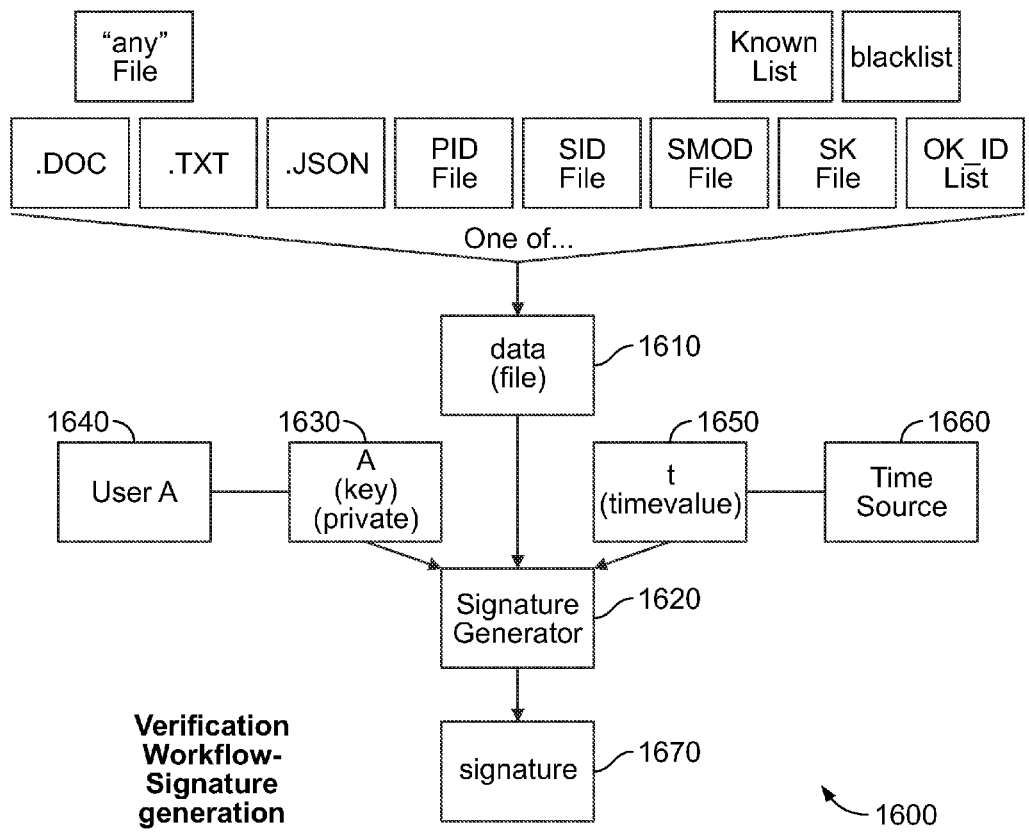
FIG. 16 illustrates the verification work flow for signature generation.

FIG. 16 illustrates the verification work flow 1600 for signature generation. As shown in FIG. 16, a data file 1610 is passed to a signature generator 1620. Additionally, a private key 1630 from a User A 1640 and a tine value t 1650 from a time source 1660 are also passed to the signature generator 1620. The signature generator 1620 then generates a signature 1670.

Figure 17:
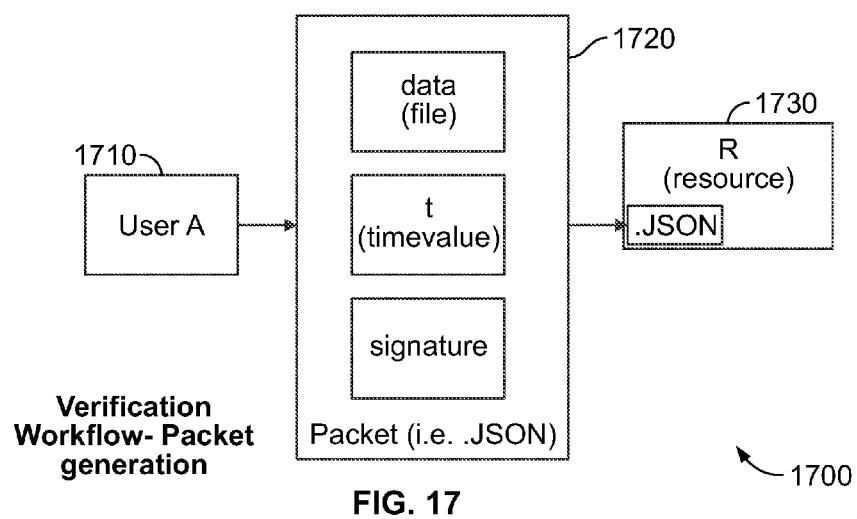
FIG. 17 illustrates the packet generation aspect of the verification workflow.
Figure 18:
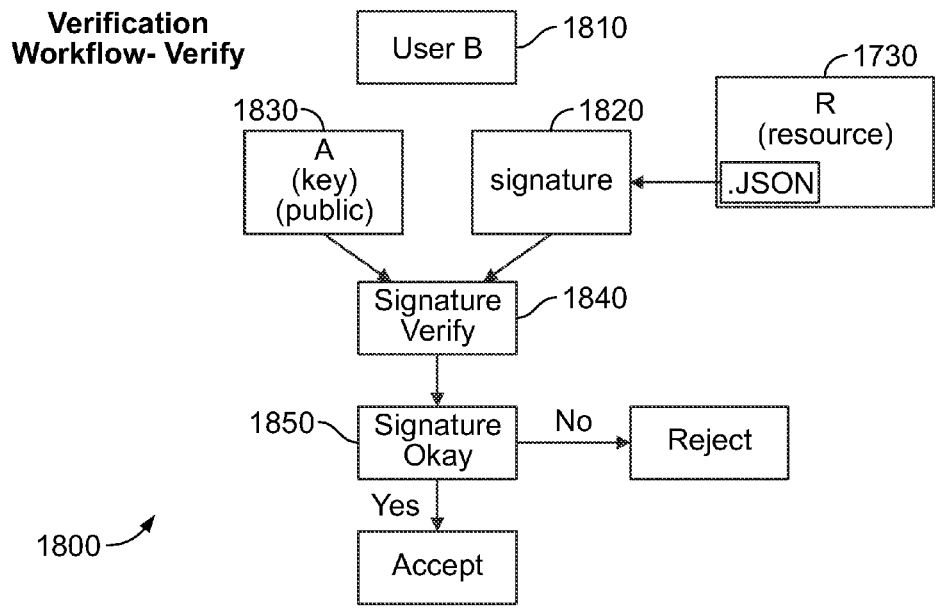
FIG. 18 illustrates the verification aspect of the verification workflow.
Figure 19:
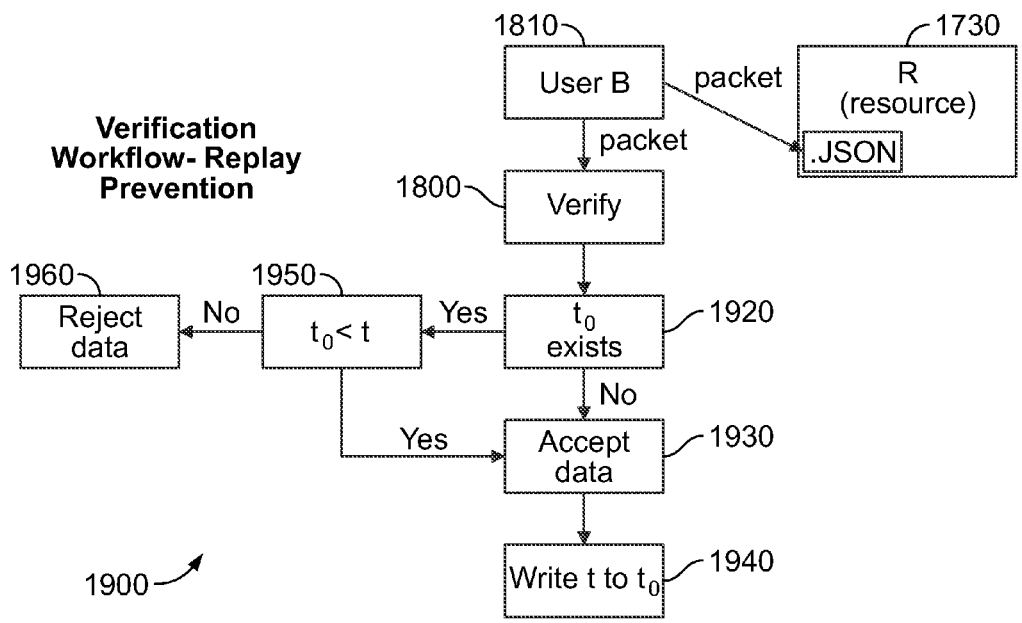
FIG. 19 illustrates the replay prevention aspect of the verification workflow.

FIG. 17-19 illustrate aspects of the verification workflow. More specifically, FIG. 17 illustrates the packet generation aspect 1700 of the verification workflow. As shown in FIG. 17, a User A 1710 provides a packet such as a .JSON packet 1720. The packet includes a data file, a time value, and a signature. The packet 1720 is then embedded in a resource 1730, for which verification is desired.

FIG. 18 illustrates the verification aspect 1800 of the verification workflow. At User B 1810, the resource 1730 is received and the signature 1820 is extracted. User B also acquires the public key of User A 1830 and passes the public key 1830 and signature 1820 to a signature verify application 1840. If the signature is OK, then the resource 1730 is accepted. If not, the resource 1730 is rejected.

FIG. 19 illustrates the replay prevention aspect 1900 of the verification workflow. At User B 1801, the resource 1730 is received and passed to the verification aspect 1800 of FIG. 18. If the signature is OK, the replay prevention aspect 1900 then proceeds to determine if the time stamp $t_0$ exists. If $t_0$ does not exist, then the data is accepted at step 1930, the present time t is written to $t_0$ and access to the resource 1730 is provided.

If $t_0$ does exist, $t_0$ is then compared to the current time t. If $t_0$ is less than (earlier than) the current time t, then the data is again accepted at step 1930. Conversely, if the $t_0$ is equal to or greater than the current time t, then the data is rejected and access to the resource 1730 is not provided.

Some example workflows of one or more embodiments of the present SFRS are presented below.

R1.0 SFRS Initialization and SID Distribution

R1.1 Initial Points

1. A user's identity in SFRS is linked to the user's Dropbox account—only one SID key pair is stored in the user's Dropbox folder, to add a new key the user first revokes the old one.

2. At first start up of SFRS, the user creates a new identity (a password protected SID file) or imports the existing one (e.g. from an existing file).

3. Once the identity is defined, the application caches SID locally and does not require the user to import it again.

4. The SFRS may not cache SID password and may request the user to input it at every start up, but the user is able to disable this check manually, using the SFRS settings.

R1.2 Pre-Conditions

1. The user starts SFRS app and links it to a Dropbox Account.

2. The SFRS app looks for the SID in the local cache folder/local secure storage.

3. If SID key is available locally the application uses it (see R1.3).

4. If the SID is not available in the local cache, but found in the cloud Dropbox folder—the application uses it from there (see R1.4).

5. If the SID is not available both in the local cache and in the cloud .SFRS (in one example (in one example. VIIVO)) root subfolder, the app requests the user to either create a new SID key pair—(see R1.5), or to import SID key pair from a local file (for example from a mounted USB drive, see R1.6).

R1.3 SID Key Pair Cached Locally

1. At start up, SFRS app finds a SID key pair in the local cache.

2. The SFRS app asks the user to provide a SID password. The password may also be stored in the local secure key storage for the computing platform. On different platforms, user may be requested to provide password to access the secure storage.

3. If password is correct, the SFRS app proceeds with its normal flow.

4. If the user fails to provide the correct password the application suggests the user to try again or login using a different Dropbox account.

1. Local SID cache lost—the user imports SID/PID again.

2. Cloud SID cache lost—the application uploads local cache to the cloud.

3. User forgot SID password—the user is asked to manually remove the SFRS folder from Dropbox, leave all shared folders secured by SFRS and re-install SFRS and generates a new SID.

4. Local SID does not match the shared encrypted metadata—the SFRS app considers the remote SID to be invalid. The SFRS app re-uploads the SID to the cloud.

5. User or SFRS app may apply verification and replay prevention method to uploaded file.

R1.4 Reusing SID from the Cloud 'SFRS' Folder

1. After linking to a Dropbox account, SFRS app notices the SID cached in the .SFRS (in one example (in one example .VIIVO)) folder in the user's Dropbox root folder.

2. The SFRS application welcomes the user back to SFRS, downloads the SID key pair and asks the user to provide the password to access the SID file.

3. If the password is correct, the SFRS application proceeds with its normal flow (downloads the remaining metadata from SFRS cloud folder, syncs the shares, etc.)

4. If the password is invalid, the SFRS application suggests the user to try again or log-in under a different Dropbox account. Encrypted folders are not accessible.

R1.5 Creating a New SID

1. User installs & runs SFRS,

2. User may link SFRS to a Dropbox account,

3. SFRS gains access to the user's Dropbox folder and looks up the SFRS (in one example (in one example .VIIVO)) folder with cached metadata in it.

4. The existing SID is not found, SFRS welcomes the new user to the SFRS app and suggests him/her to generate the new key pair (SID) or import an existing one. The user decides to create a new key.

5. The user fills in his e-mail, name and master password (for the new SID file).

6. The SFRS application generates the new SID file. The SID is cached in the local secure storage.

7. SFRS application creates the SFRS folder structure in the Dropbox, uploads the SID to the .SFRS folder and displays the congratulations screen with basic instructions on how to use SFRS and on how to use and share files on the user's other devices.

R1.6 Importing SID from Local File

1. During the first SFRS app run after fresh installation, the user selects an option to import SID from the locally stored file.

2. The SFRS application displays a standard OS file browse dialog to pick the file for import.

3. The SFRS application loads the selected files and asks the user to provide a password for the decryption.

4. If password is correct, the SFRS application accepts the key pair, adds it to the local secure cache, creates the SFRS folder structure in the Dropbox, uploads the SID pair to the .SFRS (in one example .VIIVO) folder and may show a congratulations screen with basic instructions on how to use SFRS and how to extend the use of SFRS to the user's other devices.

5. If password is not correct, the user may be requested to try again.

R1.7 Technical Details

1. Local copy of SID in the secure cache .SFRS (in one example .VIIVO) folder is linked to the user's Dropbox account and is removed when the user logs out of Dropbox or logs in again.

2. Disabling the SID password check at each start up requires the SID password. This is implemented by caching the password in the protected system storage (keychain or similar). Logging in under a different dropbox account clears the cached SID password stored in the secure storage.

3. The SID key pair may not change (except when revoked). The SFRS app may not track if local SID matches the copy in the cloud.

4. The user is able to export a SID file using a specific function from the UI of the desktop application.

5. 'Import SID from file' option is included in desktop applications.

6. SFRS monitors the SFRS tunnel—if the folder becomes shared (.dropbox file exists), the application may stop encryption/decryption and synchronization and may notify the user.

R2.0 Creating/Joining a New Share

R2.1 Key Points

1. The SFRS may utilize one or more folders. As example three folders may be used to organize the user's data (including metadata), and may only work within these folders (and their sub-folders). Two of three folders create a pair, which is called the tunnel, and secure sharing may occur within this tunnel.

a. The folder which is the outside of the tunnel may be located at the root of the users dropbox account and may be called 'SFRS' or 'VIIVO'. This folder may contain sub-folders and the hierarchy of folders contains the users encrypted data files. It also contains metadata files used for communication between devices when sharing occurs.

b. The folder which is the inside of the tunnel may be located somewhere in the users local file system, but outside of dropbox. This folder may contain sub-folders and the hierarchy of folders contains the user's un-encrypted data files.

The SFRS may utilize a third folder to store the SFRS metadata. The SFRS (in one example .VIIVO) folder resides at the root of the user's dropbox account and contains only the metadata.

2. When the 'SFRS' folder/tunnel is initialized, the content inside is private—it is encrypted with one and the same private SK for all sub-folders and may not be shared. Sharing any folder may require its re-encryption with a new SK.

3. The user may be preventing from sharing the top most (or root) SFRS folder itself. It the application detects that a root SFRS/VIIVO folder was shared, the user may be warned and SFRS may not function.

4. Secure sharing of 'the SFRS' subfolders occurs using Dropbox User Interface (UI), the SFRS provides the User Interface elements necessary to provide the secure sharing process—for example, to re-encrypt the folder, process access requests (submitted PIDs), etc.

5. The SFRS provides a UI to secure existing Dropbox shares (shared folders located outside of the user's 'the SFRS' folder).

R2.2 Pre-Condition 1. the SFRS creates or imports SID for the new Dropbox account.

2. User creates more subfolders in the SFRS folders and uploads files there.

The uploaded data is automatically encrypted with the private SK.

R2.3 Creating a Shared Folder Using Dropbox

1. The user decides to share one of subfolders in 'the SFRS.'

2. User selects the folder and shares it using Dropbox app or website.

3. The SFRS checks if it is possible to share the folder (there are no shared parent or sub-folders) and places a '.dropbox' file in it.

4. The SFRS app notices that one of the sub-folders in the SFRS folders becomes shared (.dropbox exists) and handles the share—see below.

R2.4 Processing a New Share in the SFRS

1. The SFRS starts and notices a new shared sub-folder within the 'the SFRS' tunnel. New, uninitialized, shared folders are identified according to the following conditions: '.dropbox' file exists in the folder, metadata (PIDlist, SMOD) doesn't exist in the folder, metadata (PIDlist, SMOD, SK) for this folder is not available in '(in one example .VIIVO)' cache.

NOTE: the SFRS may choose to secure only the folders within the SFRS tunnel. Support may be provided to secure a Dropbox share (folder) which is outside the tunnel. The user may be required to move it inside the tunnel first (see R2.5).

2. The SFRS may assume that the user is a moderator and puts a tentative moderator lock in the new share (see R2.8 below for details on the locking logic).

3. The SFRS generates the new SK for this folder.

4. The SFRS saves the new SK to the cloud cache and local cache.

5. The SFRS re-encrypts the data in the folder using the new SK (see R2.7 below for details).

6. The SFRS creates public metadata for the folder (the PIDlist, SMOD and blacklist) and stores them in the outside folder and in the .SFRS (in one example. VIIVO) folder.

7. Moderator or the SFRS app may apply verification check workflow and reply prevention method to files.

8. The SFRS removes the moderator's lock file. Folder sharing is complete.

9. The SFRS proceeds with its normal workflow—for example, processes all submitted PID requests for this folder.

R2.5 Securing an Existing Dropbox Folder with the SFRS

The SFRS UI allows the user to access the list of folders in the Dropbox and secure them with the SFRS.

1. User selects a shared but not secured Dropbox folder using the SFRS UI.

2. User requests to secure the folder using the SFRS (for example, presses 'the SFRS !') button.

3. The SFRS checks if the folder is shared using Dropbox (.dropbox exists):
  a. If shared—the SFRS moves the folder to the 'the SFRS' tunnel and processes it as a new share (see above),
  b. If not shared and does not include any shared parents & sub-folders—the SFRS moves the folder to the 'the SFRS' tunnel and encrypts it with the user's private SK,
  c. If not shared but included in a share or includes shares—the SFRS reports an error and does nothing.

R2.6 Joining a Share

1. When a the SFRS instance detects a new shared folder outside of the tunnel, the SFRS may check if this folder has the SFRS metadata in it (SMOD, PIDLIST, etc). If not—the folder is ignored, if yes—it's treated as a new incoming share.

2. the SFRS submits its PID and obtains an SK file for the folder (see also challenge/response flow for additional details—R6).

3. the SFRS moves the shared folder from the user's 'Dropbox' root to 'the SFRS' folder and informs the user that sharing is complete and that decrypted files are now accessible from the tunnel.

4. User or the SFRS app may apply verification check workflow and reply prevention method to files.

R2.7 the SFRS Re-Encryption

1. Re-encryption is performed over a temporary copy of original data. The original data (both locally and in the cloud) is replaced with the re-encrypted data only after re-encryption has been fully completed.

2. At re-encryption start, the SFRS uploads the specific marker of the re-encryption operation to the folder being re-encrypted to prevent data sync by other instances.

3. The application removes the marker file after re-encrypted data is uploaded to the cloud or if the re-encryption is cancelled.

4. In case if re-encryption process gets interrupted (app closed, crashed, lost connection, etc), the app may continue when it restores a working state and notices the marker file in the outside folder assuming no other moderators have stepped in. The app detects if another moderator device has taken over the process by detecting the presence of the expired moderator lock and the addition of newer moderator locks. If another moderator device has taken over, the original moderator honors the new moderator and becomes a secondary moderator device monitoring the lock activity of the new moderator.

R2.8 Tentative Moderator Lock

The SFRS instance that needs to acquire a lock checks may first check if the lock exists.

If the file exists, the SFRS checks if the lock has expired. If it has not expired, it may wait the predefined timeout, then goes to Step 1. If the lock has expired, the lock file is removed, and then proceeds to Step 3.

If the file does not exist, the SFRS tries uploading the lock file to the Dropbox folder using the Dropbox API. The lock file may have a pre-defined name. Inside the lock file is stored the device ID.

When the file completes uploading, the SFRS application on the device may re-read the lock file information and confirm if its device ID has been stored. If not, the lock is considered as not acquired. The suffixed lock files may then be removed.

R3. Read-Only Access

R3.1 Initial Points

1. When sharing a folder, moderator is able to select between read-write or read-only access levels.

2. The access level may be identified with a corresponding tag in the folder's SMOD file.

3. Read-only restriction may apply to all share participants but may not apply to the moderator. Moderators may continue to create, update, or delete files. Other users may be prevented from update or delete of files. Other users may still be allowed to create new files.

4. It is possible to change the folder's access level without the need to re-encrypt the folder or re-share it to users (for example, without generating new SK files).

5. Read-only access level have effect within the SFRS—share participants still retain full read-write access to the folder using Dropbox and thus are able to delete any encrypted file from the cloud folder or update it.

R3.2 Setting Access Level for a Shared Folder

1. Moderator opens folder sharing settings (members list) using the SFRS User Interface (UI).

2. Moderator changes the folder's access level from full (or all allowed access) to read-only. Access may alternately be changed from read-only to full, or to another partial state of access.

3. Moderator's the SFRS app updates the SMOD file in the shared folder by changing the access level tag.

NOTE: the moderator may also be able to set the folder's access level when creating a folder. This ability of a moderator may be set using an administrative setting such as a checkbox in a user interface such as provided by a sharing confirmation dialog.

R3.3 Retrieving and Enforcing the Access Level

1. Each time when accessing a shared folder (during each meta data sync event), the SFRS app reads its access level from the SMOD file.

2. If the folder's access level is read-only: the SFRS sets read-only permissions for the folder's content in the local end of the tunnel; the SFRS tunnel for the folder works one-way—the SFRS decrypts new file versions from the cloud and overwrite the local content but may not encrypt any changes to the local content and upload it to the cloud (except for the new files).

Note 1: If the user creates a new file in a read-only share, it is copied to the cloud. The moderator may then choose to keep it or remove it. This feature allows users to submit edited or modified copies of documents and files for the moderator to determine whether to keep or remove the changes. The moderator or the SFRS app may apply the verification check workflow and reply prevention method to files to assist in the determination of whether to keep or remove user changes by establishing whether the files or documents were submitted using allowed procedures of the system or by circumvention by a malicious user.

3. If the folder's access level is read-write: the SFRS sets read-write permissions for the folder's content in the local end of the tunnel; the SFRS tunnel for the folder will work in normal two-way mode.

4. the SFRS notifies the user when it changes access level for any of the folders.

R4 Exclude from Share, Un-Share, Delete Share, Uninstall

R4.1 Assumptions:

1. Moderator is able to exclude any member from a shared folder or unshare a folder entirely.

2. Exclusion is implemented by removing the user's PID from the PIDlist and does not require re-encryption.

R4.2 Excluding a User from a Shared Folder (not Blacklist)

Using the SFRS:

1. Moderator opens the list of members for the folder in the SFRS app.

2. Moderator selects a user and picks the "exclude" option in the UI.

3. The SFRS asks for confirmation.

4. The SFRS removes the user's PID from the folder's PIDlist.

5. The SFRS suggests the moderator to re-encrypt the folder and proceeds with re-encryption if confirmed.

6. The SFRS informs the moderator that the operation is complete and the moderator may now exclude or remove the user using Dropbox.

Using Dropbox:

1. Moderator removes one of the members from a shared folder using Dropbox.

2. Moderator runs the SFRS and performs the same steps as listed above.

R4.3 Un-sharing a folder:

Using the SFRS:

1. Moderator selects his shared folder and picks "Unshare" option in the SFRS UI or share extension.

2. The SFRS asks for confirmation.

3. The SFRS marks the folder as 'unshared' in the metadata.

4. The SFRS removes all PIDs from the folder's PIDlist.

5. The SFRS suggests the moderator to re-encrypt the folder and proceeds with re-encryption if confirmed.

6. The SFRS informs the moderator that the operation is complete and the moderator may now "unshare" the folder using Dropbox.

7. After the user unshares the folder in dropbox the process is completed as described below.

Using Dropbox:

1. Moderator unshares a folder using Dropbox app or web-site.

2. The SFRS app automatically detected that one of the moderator's folders is no longer shared in Dropbox.

3. The SFRS automatically removes all its meta data from the folder (PIDlist and other files).

4. The SFRS asks the user if it should re-encrypt the folder and proceeds, if confirmed.

Once these steps are complete, the 'unshare' marker is removed in the metadata.

Note #1: when unsharing a folder, the re-encryption is performed with the user's private SK (same as the one used for all other private content).

Note #2: after the folder is unshared using the SFRS, but before it is unshared using Dropbox, the user is not able to access the data in the folder.

R4.4 Deleting a Shared Folder

Deleting a folder using the SFRS—for example, the folder is removed from the user's Dropbox cloud storage but each share member still has a copy of the folder. On mobile devices, the user may not be able to remove the folder, as a mobile device may provide only read-only access.

1. Inside Tunnel

A user may remove the folder from inside tunnel. the SFRS may detect this event and may warn the user that this may get the SFRS into inconsistent state. User has an option to restore the folder from outside tunnel, or to unshare it before it is removed.

2. Outside Tunnel

When the folder is removed from the outside tunnel, the SFRS also detects that event but just warns the user about that event and with the instruction that other users having access to that folder should re-share it again with the current user.

If the folder was removed for the moderator—other users are not able to join the folder.

If the folder was removed for another user—from the SFRS viewpoint s/he still has access to it.

R4.5 Detecting User Exclusion and Folder Unshared on Another User's Side

Part 1—Exclusion

1. Each time when the SFRS app accesses a shared folder it checks if its PID is in the PIDlist.

2. If the PID is not in the PID list, the SFRS checks if the folder has been shared with it previously (SK is available).

3. If the folder is a new one—the SFRS proceeds with a standard flow for new shares. If the folder has been shared previously—the SFRS understands that it has been excluded from it.

4. The SFRS informs the user that s/he has been excluded from the folder and blocks access to it. The SFRS asks the user what s/he would like to do: (a) resend the PID-invitation for that folder or (b) mark the folder as blocked:

a. The PID-invitation is regenerated by the SFRS application.

b. The SK stored locally for the folder is removed, specific 'blocked' marker is placed into the local cache of the SFRS folder.

Part 2—Folder 'Unshare'

1. The SFRS keeps track on the list of shared folders available to it (compare the actual list of shared folders to the structure in the SFRS cloud cache).

2. In case if any of the shared folders are no longer accessible using Dropbox (unshared or kicked out), the SFRS removes all the metadata for such folders from both the local and cloud cache (including the SKs and 'blocked' markers). User is informed that if s/he wants to restore access to that folder s/he needs to request that folder to be re-shared with her by the moderator.

R5. De-Verify PID (Blacklisting)

R5.1 Key Points

1. Each the SFRS user is able to blacklist any other the SFRS user regardless of their roles (moderator, user).

2. When blacklisting a user the user is asked to repeat an identity verification first, but this is done at the user's discretion. It is possible to blacklist a user without a check.

3. Blacklisting is global, meaning that it applies to all the shares available to a user (including future ones).

4. Blacklisting is reversible—if user A mistakenly blacklisted user B there is an option to revert that.

5. In terms of this workflow 'user' implies 'PID', i.e. blacklisting is applied to a specific PID, not all PIDs with a specific email or name.

6. There are two types of blacklist—personal (stored locally and in the user's the SFRS cloud cache) and shared (stored in the shared folder near the PIDlist). Having a PID in the personal blacklist causes the SFRS app to automatically reject share invitations and key requests from this PID. Having a PID in a shared folder's blacklist indicates that this PID is not able access this folder, his the SFRS app does not let him even if he has SK.

R5.2 Common Flow

1. User A decides to blacklist User B for some reason (B failed identity check, is an impostor, etc.).
2. User A selects user B in his trusted list or a list of co-sharers for any shared folder.
3. User A requests the User B to be blacklisted using UI.
4. The SFRS shows a warning. User proceeds.
5. The SFRS suggests to run an identity check (described earlier), if not already checked.
6. User A confirms blacklisting anyway.
7. The SFRS of the user A adds PID of the user B to the personal blacklist in the local cache and uploads it to the cloud cache .SFRS (in one example .VIIVO) folder.
8. The SFRS removes user B from the trusted list.
9. The SFRS goes through each accessible shared folder.
9.1. For folder where A is an ordinary user
  a. The SFRS checks if B is a moderator.
  b. If yes, the SFRS asks the user A if s/he would like to leave all shared folders managed by B.
  c. If confirmed, the SFRS adds "leave" flag to the B's entry in the personal blacklist and clears all metadata for folders managed by B both in the local and in the cloud cache, stores in the metadata for these folders the specific 'leave' flag.
  d. The SFRS suggests user A to leave all folders managed by B using Dropbox.
  e. Access to the folders marked with 'leave' flag is locked.
9.2. For Folder where A is a Moderator
  a. The SFRS checks if the folder is shared to B. If not—go to the next folder. If yes:
  b. The SFRS adds B's PID to the folder's blacklist, remove B's PID from the folder's PIDlist.
  c. The SFRS asks if it should re-encrypt shared folder and proceeds if confirmed.
  d. The SFRS suggests user A to exclude B using Dropbox.

R5.3 Handling Blacklisted Users

The SFRS looks up PIDs in the personal blacklist at the following events:

1. Before uploading PID to a new folder—does not upload if moderator is blacklisted,
2. Before accepting a new SK file—does not accept if file signer (moderator) is blacklisted,
3. When issuing an SK file—does not issue if recipient's PID is blacklisted.

R5.4 Enforcing Blacklist to the Blocked Side

1. Each time when a the SFRS app attempts accessing a shared folder (during sync, upon request, when a new folder received, etc.) it looks up it's own PID in the blacklist.
2. If the PID is there, the SFRS app shows a message to the user explaining that he got blacklisted and suggesting him to contact the moderator (e-mail provided).
3. The SFRS application blocks user's access to this folder, stops syncing, clears the local end of tunnel for this folder, and removes all cached meta data for this folder both locally and from the cloud. Note: Other folders than the SFRS folders remain accessible.

R5.5 UN-Blacklisting

The SFRS app enables the user to see a list of blacklisted users and restore (un-blacklist) them. When User A requests to un-blacklist User B:

1. The SFRS will asks for confirmation,
2. If confirmed, the SFRS removes the PID of the user B from the A's personal blacklist both locally and in the cloud.
3. Then the SFRS goes through all moderated folders and removes B's PID from the blacklist.

Note: un-blacklisting does not generate new SKs for the user or restore him in PIDlists or SMODs. The user preferably needs to request access to all shares again, like for the first time.

R5.6 Technical Details

1. In addition to the listed flows blacklisting is available as a part of the verification flow. It the counterpart fails verification the user is offered to blacklist it.
2. No blacklist sharing or importing of blacklisted PIDs from shared blacklists to the personal one.
3. Blacklist file is a signed JSON file similar to PIDlist.
4. Local blacklists are synced with the cloud cache as part of other metadata.
5. Shared blacklist is signed by the moderator. Personal blacklist is signed by the user's PID.

R6. PID Verification (Challenge/Response)

R6.1 Initial Points

Every the SFRS application stores a users list of the known PIDs both locally and in the cloud cache folder.

If the PID is known, no validation is required. Whenever any request is performed, or when the operation requires collaboration with another user with the unknown PID, the validation process preferably takes place.

The user is able to accept the identity of a certain PID bypassing the validation.

Validation process represents the challenge-response sequence with the communication carried through a shared Dropbox folder inside the SFRS tunnel in an encrypted form. Identity check is available.

R6.2 Pre-Conditions

1. Moderator/delegate shares a folder to the User using Dropbox.
2. User accepts Dropbox invitation.
3. User's the SFRS app notices a new shared folder (the session keys for which are not yet available in the User's cache), automatically uploads the user's PID file to the folder and waits for an SK or a challenge.
4. User's the SFRS app notices the new delegate with the unknown PID to be added to the earlier shared folder.
5. User's the SFRS app notices that the folder has been shared with the user with yet unknown PID.
6. the SFRS app may apply verification check workflow and reply prevention method to files.

R6.3 ID Check when Granting Access

1. When moderator's/delegate's the SFRS app finds a new PID file in the shared directory it retrieves the file and removes it from the shared folder.
2. The app checks if the PID owner is in the trusted list. If yes—it automatically uploads an SK file for the PID to the folder and updates PIDlist. If not, it displays a dialog with the PID owner details (name, email) to the moderator/delegate and asks if it should grant access, block access or verify the identity.
3. If the moderator/delegate requests an identity check, the app asks him to fill in the challenge text and uploads this text to the shared folder. At this point the folder-sharing process is suspended; and may be automatically restarted, when the challenge-response authorization is completed.

4. The user's app finds a challenge request file, retrieves it, decrypts it and checks the signature. If signature is OK, the app shows challenge text and sender details (name email) to the user.

5. The user contacts the challenge sender (calls or sends an email) and discusses the challenge.

6. The user fills in a response text for the challenge; the app removes the challenge request file from the server and uploads a response file instead.

7. The moderator's/delegate's app finds a challenge response file, retrieves it, removes it from the shared folder, decrypts it and checks signature. If OK, it displays the response text to the moderator/delegate.

8. If the moderator/delegate confirms the response as valid, after an additional confirmation, the PID owner should be added to the trusted list. At this stage, the folder-sharing process is resumed.

Note: if challenge file signature is invalid or the answer is invalid—the app shows a warning and removes the challenge file from the folder and suggests leaving/unsharing the folder using Dropbox. Afterwards the sharing process may be repeated form the very beginning.

R6.4 ID Check when Requesting/Accepting Access

1. The user's SFRS app notices an SK file generated for it in the shared folder, it retrieves it and removes it from the share.

Note: The SFRS app may also notice the new moderator signature in the shared dropbox folder, or notice a new delegate's PID in the smod file, or notice the new user with whom the folder is shared in the pidlist. In this case the challenge-response authorization will also be suggested to the user.

2. The app checks if the person who generated the SK file is in the trusted list or not. If yes—the app accepts the key without any further user interaction. If not—the app shows a dialog with information on the sharer (name and email of the person who generated the SK file) and the following options—join the folder (accepts the SK file), discard the invitation (removes the SK file, requests the user to leave the folder using Dropbox), check identity (same request-responce sequence as described above). At the moment when the challenge is sent the process is suspended and resumed when the challenge is received.

3. Once the identity is confirmed the user's application accepts the SK file (caches it and removes it from the shared folder) and suggests the user to add SK file creator to the trusted list.

Note: if the ID was taken not from the SK file, after confirmation the PID is simply stored locally to the list of trusted PIDs.

R6.5 Technical Details

1. While the SK is not yet retrieved and accepted by the user the new shared folder is specifically marked as 'temporary'. An attempt to open this folder using the SFRS displays a message explaining the folder's state (e.g. 'awaiting confirmation from share sender' or 'waiting for share senders identity check').

2. The challenge request/response file is a JSON file with a pre-defined extension (e.g. 'clg') and a name uniquely identifying the file's intended recipient (e.g. the recipient's PID). The file content includes the sender's PID and details (name, email), and the request or response text. The file is asymmetrically encrypted with the recipients public key.

3. In case if the moderator's/delegate's app finds several new PID files in the shared folder they are processed one-by-one.

4. The user is able to manage the list of trusted users using a specific section in the UI—it is possible to remove the users from the trusted list and add any person listed in PIDlists of the accessible folders to it. Adding a new person to the trusted list does not require identity check but may require double confirmation from the user. The list of the trusted users is synchronized with the SFRS root subfolder.

R7. PID Revocation

R7.1 Initial Points

1. PID revocation is used only when the user believes that the sensitive data is compromised.

2. PID revocation may not be undone.

3. PID revocation is the process to both inform the collaborators but also to prevent unauthorized access to the SFRS data in the private folders. PID is revoked from all the collaborators, not only moderators.

R7.2 Main Flow

User starts the PID revocation process. To User is displayed the double confirmation to start this process. The User is warned of the consequences.

User confirms. If not—the process is terminated.

The SFRS application then removes all the SK files from the local cache and the SK files from the hidden root .SFRS (in one example .VIIVO) folder; removes the SID from the .SFRS (in one example .VIIVO) subfolder.

The SFRS application places the specific marker into the hidden .SFRS (in one example .VIIVO) root folder (see the Subflow A below).

The SFRS application removes all the files in the Tunnel in the private user's the SFRS folders (from Dropbox and locally). These files will typically need to be re-encrypted in any case. If the user is a moderator, the files are moved from all the shared folders that the user is a moderator.

The SFRS application uploads the specific revocation marker to all the shared folders Revoke_PID file encrypted with the user's private key (see Subflow B).

User is requested to leave all the folders in Dropbox inside the Tunnel (when the user 'Leaves' the folder, the folder is no longer shared with him/her), and restart the SFRS.

Note: After the revocation the user's Dropbox is free of any the SFRS metadata from the previous SID; the user is able to generate a new SID after he starts the SFRS application next time.

When a blacklisted application starts again, it checks all the files inside the tunnel for presence of shared folders. If it detects the shared marker in any folder, the process proceeds to step 5.

If the app does not see the .dropbox marker of the shared folder inside any Tunnel subfolder, the application removes all the remaining files inside the tunnel, regenerates SID/PID and the process of the initial SID/PID sync between all the user's workstations will happen, and removes the Revoke_PID marker from the .SFRS (in one example .VIIVO) subfolder.

R7.3 Subflow A—Blocking Yourself

Here, the SFRS application sees the marker of the PID revocation process in its cloud cache—the .SFRS (in one example .VIIVO) root folder. The application then removes copies of the SK files stored locally; disables syncs from/to the SFRS tunnel; denies user's access to the SFRS app and suggests the user to complete the PID revocation process; and removes files from the local copies of files inside the the SFRS Tunnel (both shared and private).

R7.4 Subflow B—Blocking Other User

Here, the SFRS application sees the Revoke PID marker in any shared folder. The SFRS adds the revoked PID to a list of revoked PIDs stored in the .SFRS (in one example .VIIVO) cloud cache (the lists are personal).

For any folder the user is a moderator: the PID file is removed from the PIDlist, the SK is regenerated and the content is re-encrypted, while the content is being re-encrypted, the specific moderator-signed marker is placed to the folder that prevents its modification using the SFRS by other users, and new SK is distributed for all other users.

For any folder the user is a delegate and the revoked PID is NOT the moderator's PID: the PID is removed from the PIDlist, saved SKs are removed, and new SKs are stored.

For any folder the user is a delegate and the revoked PID is the moderator's PID: delegate status for the corresponding folder is cleared;

R7.5 Technical Details

The lists of revoked users are personal for each user, are stored in the SFRS cloud cache and are preferably not shared, synced or merged between different the SFRS users.

One embodiment of the present invention includes a system including computer storage provided by a storage provider where users of the system store electronic information. This computer storage may use physical disk storage or virtual disk storage. Storage may be maintained by physical or virtual management server systems used to manage and access this storage by users. Storage may be contained within a single location, or geographically dispersed. Storage may be implemented as a "cloud" architecture.

Access to this computer storage may occur through direct access through the management servers, or by other methods. Access in the preferred implementation is provided using a network connection. The network connection may be implemented using a wired or wireless connection and would preferably be provided over the public internet. Other types of network connections may be used.

Users of the system access the computer storage from a range of computing devices having temporary or permanent connections to the network. Computing devices may include, but are not limited to, mainframe and midrange servers such as those operating under IBM z/OS, or UNIX and Linux operating systems, personal computers, workstations, laptops, mobile phones, smartphones, tablets, optical or magnetic disk drives, printing devices, network storage devices, or digital imaging devices.

A user of a computing device may use any of a number of available software tools to manually apply the verification and replay prevention method to their stored information. A user may determine a value for the current time, combine data with the time value to produce a signature using a private key. Then store the signature and the information to the shared storage. It is preferable that the application software available on their computing device incorporates the verification and replay prevention method within the application operation to reduce the steps a user manually performs on their stored information.

This method of protecting information through verification and replay prevention is suitable for use within any type of software or hardware processing that desires a verification process for information. For example it may provide verification of information used within an operating system kernel process or within the input/output subsystems or device drivers of an operating system that store and manage information.

This method may also be integrated into software applications that operate as a "user level" process or it may operate in software that provides internet access or that operates using the internet to access or share information. Examples may be file transfer or copy programs, email or messaging applications, productivity or workflow applications, file management and file system management applications. Other types of software applications may be used.

Software may include this method on one or more computing platforms including mainframe and server platforms running operating systems including, but not limited to, IBM z/OS, Microsoft Windows, or Linux. Other platforms on which this method may be enabled include personal computers, servers, physical or virtual server appliances, virtual machines, laptops, mobile devices, smart phones, tablets, optical or magnetic disk drives, printing devices, network storage devices, SAN, NAS, or digital imaging devices. Other computing platforms may be used.

Information may be electronic files (or resources R) that contain documents, spreadsheets, presentations, emails or messages, calendars, contact information, database files, compressed files, encrypted files, ZIP files, OpenPGP files, archive files, graphical and binary image files, pictures, text files, program files, library files, metadata, and other information that may be stored on a computer. Metadata is information about files, systems, configurations/settings or users that is used by the software and applications that process files created and used by the applications and their users. Metadata may include, but is not limited to, file names, file sizes, time and date information, location, allowed access, compression information, encryption information, encryption keys, known user or trust lists, denied user or blacklists, system state information, PID, SID, SMOD, OK_ID, .MOD, JSON files. Collectively or individually, this information may be referred to as data.

Data encryption may be applied to information in electronic files using encryption algorithms including, but are not limited to RSA, DES, 3DES, AES, Blowfish, Twofish. Other encryption algorithms may be used. Data encryption algorithms may symmetric or asymmetric keys. Data encryption algorithm may be used with any of a number of bit strengths. Data encryption algorithm bit lengths that define the strength of an algorithm such as 168 bits, 192 bits, or 256 bits, 512 bits, 1024 bits, 2048 bits and 4096 bits may be used. Other data encryption algorithm bit lengths may be used.

Data authentication may be applied to information in electronic files using authentication methods including but not limited to digital signatures such as may be applied using a public/private key pair, cyclic redundancy checks such as CRC-32, secure hash functions such as MD5, RIPEMD, SHA-1, SHA-256, SHA-384, or SHA-512, or HMAC.

Data compression may applied to information in electronic files using data compression algorithms including, but not limited to Deflate, PPMd, Lempel-Ziv-based algorithms including LZMA. Other data compression algorithms may be used. Data compression reduces the bytes needed to store an electronic file, making the compression copy of a file smaller than the original. When a file is compressed, the original may be removed to reduce storage requirements.

Electronic information files compressed to reduce size using data compression may be placed within compressed archive formats before being placed into cloud storage. Compressed archive formats used to compress electronic information files include, but are not limited to the .ZIP format by PKWARE, Inc., RAR, and others.

Encryption keys used within the data encryption processing of information in electronic files may be of any type commonly used. Types of encryptions keys used include but are not limited to passwords, passphrases, tokens, one-timepads, public/private key pairs and others. Public/private key pairs may be of X.509 or OpenPGP. Other encryption key specifications may be used.

One-way hash functions may include, but are not limited to MD5, RIPEMD, SHA-1, SHA-256, SHA-384, or SHA-512. Other one-way hash functions may be used.

A user may be a member or an entity obtaining a membership or an entity that has not obtained a membership.

A member is a user that has obtained a membership through a storage provider.

User A (A) may be a user, a member, a moderator, a non-moderator, a delegate, or have another role within a given workflow of one or more embodiments of the present invention.

User B (B) may be a user, a member, a moderator, a non-moderator, a delegate, or have another role within a given workflow of one or more embodiments of the present invention;

A delegate may be a member granted authority by a moderator to perform actions of, or on behalf of, a moderator.

A moderator is a member having authority to allow, deny, or revoke shared access abilities of other members.

The files and folders used within one or more embodiments of the present invention may operate on single device, on cloud storage, or on other storage method such as SAN or NAS. Files and folders used within the one or more embodiments of the present invention may reside on different devices or storage locations. For example data files may reside on user device and a cloud storage device and metadata may be placed onto separate storage from the data such as a server, or other computer storage.

One or more embodiment of the present may include methods used to securely share information by integration within existing sharing systems available today including, but not limited to Microsoft SharePoint or IBM Lotus Symphony. The one or more embodiments of the present invention also include methods used to securely share information by integration within other information sharing systems including but not limited to Facebook, Google+, LinkedIn, Twitter, Skype, Chatter, or Apple FaceTime.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A computerized method including:
   receiving a file on a computer, wherein said file on said computer contains data, wherein said data is unencrypted;
   placing said file into a replication folder on a local computer storage, wherein said replication folder is a copy of a cloud storage folder, wherein said cloud storage folder includes a PIDlist file, wherein said PIDlist file includes an encryption key for a first user;
   generating an unencrypted session key from random data;
   using said unencrypted session key to encrypt said file forming an encrypted copy of said file, wherein said encrypted copy of said file is formatted in accordance with the .ZIP format;
   using said encryption key for said first user to encrypt said unencrypted session key forming an encrypted session key;
   placing said encrypted session key into a session key file; and
   placing said encrypted copy of said file and said session key file onto a cloud storage folder,
   wherein said encrypted files are encrypted using an unencrypted session key generated from random data,
   wherein said unencrypted session key is encrypted using an encryption key for a first user that has been retrieved from said cloud based data storage.

2. The computerized method of claim 1 wherein said replication folder includes an SID file.

3. The computerized method of claim 2 wherein said SID file includes a decryption key of a first user.

4. The computerized method of claim 2 wherein said SID file resides in a different cloud storage folder than the encrypted copy of said file.

5. The computerized method of claim 1 wherein said PIDlist file resides on a different cloud storage folder than an encrypted copy of said file.

6. The computerized method of claim 1 wherein said PIDlist file includes encryption key of a second user.

7. The computerized method of claim 1 wherein said session key is encrypted using the encryption key of a second user.

8. The computerized method of claim 1 wherein said session key file resides on a different cloud storage folder than an encrypted copy of said file.

9. A system for secure folder replication, said system including:
   a user computer; and
   a cloud-based data storage;
   wherein a cloud-based data storage application is installed on said user computer, wherein said cloud-based data storage application provides an application folder on said user computer and data files placed in said application folder are copied to said cloud-based data storage,
   wherein a secure folder replication system is also installed on said user computer, wherein said secure folder replication system provides a secure folder on said user computer and data files placed in said secure folder are automatically encrypted by said secure folder replication system to form encrypted files, wherein said encrypted files are formatted in accordance with the .ZIP format,
   wherein said encrypted files are encrypted using an unencrypted session key generated from random data,
   wherein said unencrypted session key is encrypted using an encryption key for a first user that has been retrieved from said cloud based data storage,
   wherein said encrypted files are passed to said application folder and are copied to said cloud-based data storage.

10. The computerized system of claim 9 wherein said secure folder includes an SID file.

11. The computerized system of claim 10 wherein said SID file includes a decryption key of a first user.

12. The computerized system of claim 9 wherein said cloud-based data storage includes a PIDlist file.

13. The computerized system of claim 12 wherein said PIDlist file includes an encryption key of a first user.

14. The computerized system of claim 10 wherein said SID file resides on a different cloud storage folder than the encrypted copy of said file.

15. The computerized system of claim 12 wherein said PIDlist file resides on a different cloud storage folder than the encrypted copy of said file.

16. A computerized method including:
creating a shared folder on a first user computer, wherein said shared folder is associated with a shared folder session key generated from random data and stored on said first user computer,
wherein data stored in said shared folder is automatically copied to a cloud storage folder,
wherein said cloud storage folder includes a PIDlist file, wherein said PIDlist file includes a first user encryption key;
receiving a file at said first user computer;
generating an unencrypted session key from random data;
using said unencrypted session key to encrypt said file forming an encrypted copy of said file;
using said first encryption key for said first user to encrypt said unencrypted session key forming a first user encrypted session key;
placing said first user encrypted session key into a session key file; and
placing said encrypted copy of said file and said session key file onto a cloud storage folder,
wherein said encrypted file is encrypted using an unencrypted session key generated from random data,
wherein said unencrypted session key is encrypted using said encryption key for said first user that has been retrieved from said cloud based data storage;
placing said encrypted file in said shared folder wherein said encrypted file is automatically copied to said cloud storage folder;
providing access to said cloud storage folder to a second user;
receiving a second encryption key for said second user and adding said second encryption key to said PIDlist file for said shared folder, wherein said PIDlist file is automatically replicated on said first user computer;
using, at said first user computer, said second encryption key for said second user to encrypt said unencrypted session key to form a second user encrypted session key; and
storing said second user encrypted session key in said PIDlist.

17. The computerized method of claim 16 further including sending a hypertext link to said cloud storage folder from said first user computer to said second user computer.

18. The computerized method of claim 16 wherein said shared folder includes an SID file.

19. The computerized method of claim 16 wherein said SID file includes a decryption key of a first user.

20. The computerized method of claim 19 wherein said SID file resides in a different folder than the encrypted copy of said file.

21. The computerized method of claim 16 wherein said PIDlist file resides on a different cloud storage folder than an encrypted copy of said file.

22. The computerized method of claim 16 wherein said session key file resides on a different cloud storage folder than an encrypted copy of said file.

* * * * *